(12) United States Patent
Kim et al.

(10) Patent No.: US 10,666,786 B2
(45) Date of Patent: May 26, 2020

(54) METHOD AND ELECTRONIC DEVICE FOR CONTROLLING EXTERNAL ELECTRONIC DEVICE

(71) Applicant: SAMSUNG ELECTRONICS CO., LTD., Suwon-si, Gyeonggi-do (KR)

(72) Inventors: Jin-Young Kim, Suwon-si (KR); Sung-Jae Park, Suwon-si (KR); Eun-Young Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/074,866

(22) PCT Filed: Jan. 19, 2017

(86) PCT No.: PCT/KR2017/000649
§ 371 (c)(1),
(2) Date: Aug. 2, 2018

(87) PCT Pub. No.: WO2017/135599
PCT Pub. Date: Aug. 10, 2017

(65) Prior Publication Data
US 2019/0045043 A1 Feb. 7, 2019

(30) Foreign Application Priority Data
Feb. 3, 2016 (KR) .................. 10-2016-0013615

(51) Int. Cl.
*H04M 1/725* (2006.01)
*G06F 9/451* (2018.01)
*G06F 3/0484* (2013.01)
*G06F 3/0488* (2013.01)
(Continued)

(52) U.S. Cl.
CPC ...... *H04M 1/72533* (2013.01); *G06F 3/0488* (2013.01); *G06F 3/04847* (2013.01);
(Continued)

(58) Field of Classification Search
CPC .......... H04M 2207/18; H04M 1/72533; G06F 1/163; G06F 3/0488; G06F 3/0416;
(Continued)

(56) References Cited

U.S. PATENT DOCUMENTS 9,892,463 B1 * 2/2018 Hakimi-Boushehri ...................... G06Q 40/08
2011/0047493 A1 * 2/2011 Sung ..................... G06F 3/0488
715/765

(Continued)

FOREIGN PATENT DOCUMENTS

| KR | 10-2006-0116637 | 11/2006 |
| KR | 10-2011-0057546 | 6/2011 |

(Continued)

OTHER PUBLICATIONS

International Search Report for PCT/KR2017/000649 dated Apr. 27, 2017, 4 pages.

(Continued)

*Primary Examiner* — Nizar N Sivji
(74) *Attorney, Agent, or Firm* — Nixon & Vanderhye, P.C.

(57) ABSTRACT

A method for controlling an external electronic device of an electronic device, according to various embodiments, comprises the steps of: receiving data information corresponding to at least one function of the external electronic device from an external electronic device connected to the electronic device; displaying a setting window for setting a user interface for controlling the external electronic device using the data information; selecting a control item corresponding to the at least one function included in the setting window according to user input reception; and setting and displaying the user interface corresponding to the selected control item. Other embodiments are possible.

15 Claims, 15 Drawing Sheets

(51) Int. Cl.
*G08C 17/02* (2006.01)
*H04L 12/28* (2006.01)
*H04W 4/12* (2009.01)

(52) U.S. Cl.
CPC ............ *G06F 9/451* (2018.02); *G08C 17/02* (2013.01); *H04L 12/2818* (2013.01); *H04M 1/72583* (2013.01); *H04W 4/12* (2013.01); *G08C 2201/20* (2013.01); *G08C 2201/30* (2013.01); *G08C 2201/51* (2013.01); *G08C 2201/70* (2013.01); *G08C 2201/93* (2013.01); *H04L 2012/2841* (2013.01); *H04M 2250/22* (2013.01)

(58) Field of Classification Search
CPC ... H05K 5/0017; H04W 4/12; G08C 2201/51; G08C 2201/70; G08C 2201/93; G08C 17/02; H04L 2012/2841; H04L 12/2803; H04L 12/2807; H04L 12/2816; H04L 12/282; H04L 12/2832; H04L 2012/285; H04L 67/16; H04L 12/2818
See application file for complete search history.

(56) References Cited

U.S. PATENT DOCUMENTS

2016/0092847 A1* 3/2016 Buchbinder ........... G06Q 10/20
705/26.8
2016/0132031 A1* 5/2016 Kozura ............... H04L 12/2816
700/275

FOREIGN PATENT DOCUMENTS

| KR | 10-2012-0072518 | 7/2012 |
| KR | 10-1406004 | 6/2014 |
| KR | 10-2015-0005800 | 1/2015 |
| KR | 10-2015-0028008 | 3/2015 |
| KR | 10-2015-0086150 | 7/2015 |

OTHER PUBLICATIONS

Written Opinion of the ISA for PCT/KR2017/000649 dated Apr. 27, 2017, 7 pages.

* cited by examiner

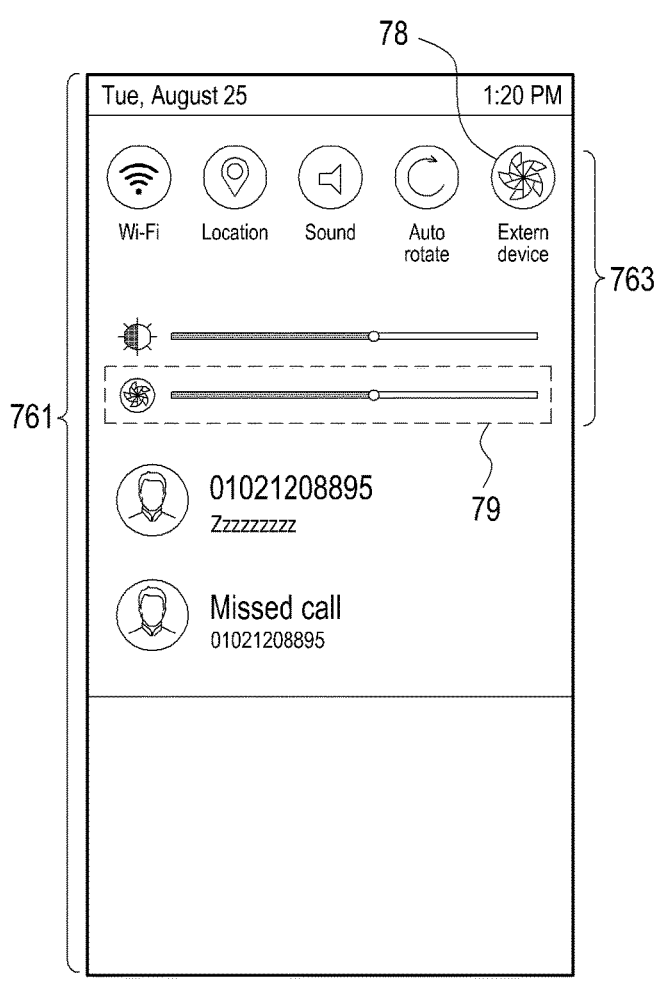
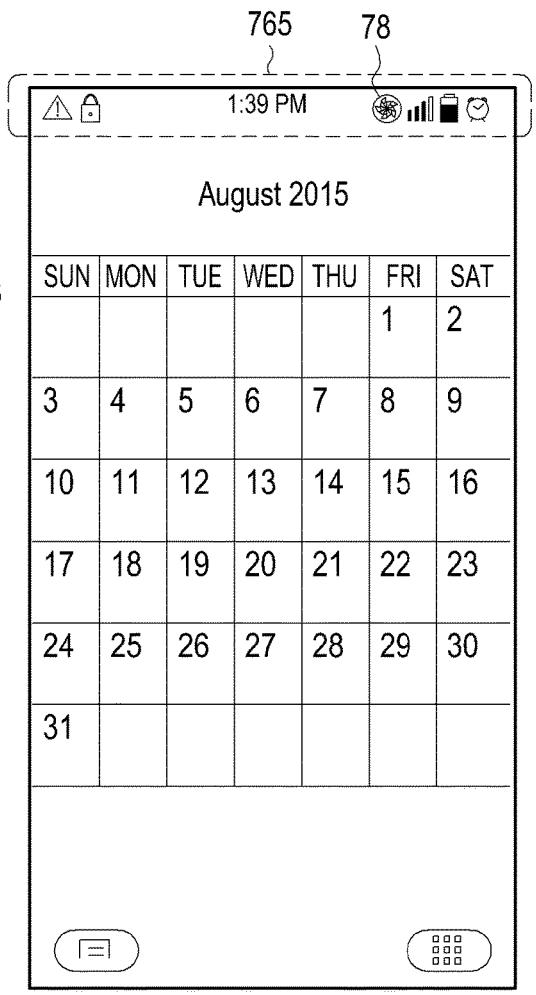
FIG.7E                    FIG.7F (a)

(b)

METHOD AND ELECTRONIC DEVICE FOR
CONTROLLING EXTERNAL ELECTRONIC
DEVICE

This application is a National Phase Entry of PCT International Application No. PCT/KR2017/000649, which was filed on Jan. 19, 2017, and claims priority to Korea Patent Application 10-2016-0013615, which was filed on Feb. 3, 2016, the contents of which are incorporated herein by reference.

TECHNICAL FIELD

The present disclosure generally relates to a method and an electronic device for controlling an external electronic device.

BACKGROUND ART

The use of electronic devices, such as tablet PCs, smart phones, smart watches, and the like has become universalized, and technology related to the control of external electronic devices using a wireless communication function has been developed and applied to electronic devices, in addition to functions related to photos, music, videos, games, and the like.

Also, recently used electronic devices provide user interfaces that show the states of the electronic device such that users can easily recognize the current state information of corresponding electronic devices. For example, an electronic device displays state information, such as a received signal strength indication (RSSI) of the electronic device, the state of a remaining charge of the battery, notification information, and the like, in a designated area of a screen of the electronic device.

DETAILED DESCRIPTION OF THE INVENTION

Technical Problem

Conventionally, an electronic device provides only setting items related to the current state of the electronic device, whereby a user is unable to additionally register predetermined information, for example, a setting item other than the items set in the current electronic device, which is a drawback.

Also, with the advancement of technology, connection and communication between an electronic device and an external electronic device are frequently performed. Conventionally, for the connection and communication between the electronic device and the external electronic device, a user may need to additionally install, in the electronic device, an installation program provided from a developer of the external electronic device or the like, which is inconvenient for the user.

Also, when an electronic device desires to change the state or settings of a connected external electronic device, the user needs to search for and execute a corresponding application installed in the electronic device, which is also inconvenient for the user. Also, an operation associated with the external electronic device may be performed only in the state in which the application is executed. Accordingly, the user can change settings via the application after switching the currently executing application to the background. In this instance, the currently executing application may be unintentionally terminated, which causes inconvenience for the user.

Accordingly, various embodiments provide a method and an electronic device for controlling an external electronic device, wherein the method and the electronic device may make it easy to install, in the electronic device, a program for controlling an external electronic device, so as to identify state information of the external electronic device connected to the electronic device or to change settings.

Various embodiments provide a method and an electronic device for controlling an external electronic device, wherein the method and the electronic device may identify state information of an external electronic device connected to the electronic device via a simple operation.

Various embodiments provide a method and an electronic device for controlling an external electronic device, wherein the method and the electronic device may alleviate the burden of searching for and executing an installed program to control an external electronic device, thereby quickly changing settings of the external electronic device.

Various embodiments provide a method and an electronic device for controlling an external electronic device, wherein the method and the electronic device may display state information of an external electronic device in a predetermined indicator area or a notification panel area, such that a user quickly changes settings of the external electronic device using the areas.

Technical Solution

In accordance with an aspect of the present disclosure, a method of controlling an external electronic device by an electronic device is provided, and the method includes: receiving, from an external electronic device connected to the electronic device, data information corresponding to at least one function of the external electronic device; displaying a setting window for setting a user interface for controlling the external electronic device using the data information; selecting a control item corresponding to the at least one function included in the setting window according to reception of user input; and setting and displaying the user interface corresponding to the selected control item.

In accordance with an aspect of the present disclosure, an electronic device is provided, and the electronic device may include: an input unit; a communication unit; a display; and a processor configured to: receive, from an external electronic device connected via the communication unit, data information corresponding to at least one function of the external electronic device; display, on the display, a setting window for setting a user interface for controlling the external electronic device using the data information; select a control item, which corresponds to the at least one function and is included in the setting window, according to user input received via the input unit; and set the user interface corresponding to the selected control item and display the user interface on the display.

Advantageous Effects

According to various embodiments, a method and an electronic device for controlling an external electronic device may make it easy to install, in the electronic device, a program for controlling an external electronic device so as to identify state information of the external electronic device connected to the electronic device or to change settings. Also, the state information of the external electronic device connected to the electronic device may be identified with a simple operation. Also, the burden of searching for and executing an installed program to control the external electronic device may be eliminated, whereby a user can quickly change the settings of the external electronic device. Accordingly, the user may omit a process of searching for a predetermined application installed in the electronic device and installing and/or operating a program for controlling the external electronic device, whereby the user can conveniently operate the electronic device. Also, the developer of an external electronic device may be freed from the burden of developing an additional application for communicating with the electronic device and controlling the same.

BRIEF DESCRIPTION OF DRAWINGS

FIGS. 7A, 7B, 7C, 7D, 7E, and 7F are diagrams illustrating control of an external electronic device by an electronic device according to various embodiments;

MODE FOR CARRYING OUT THE INVENTION

Figure 1:
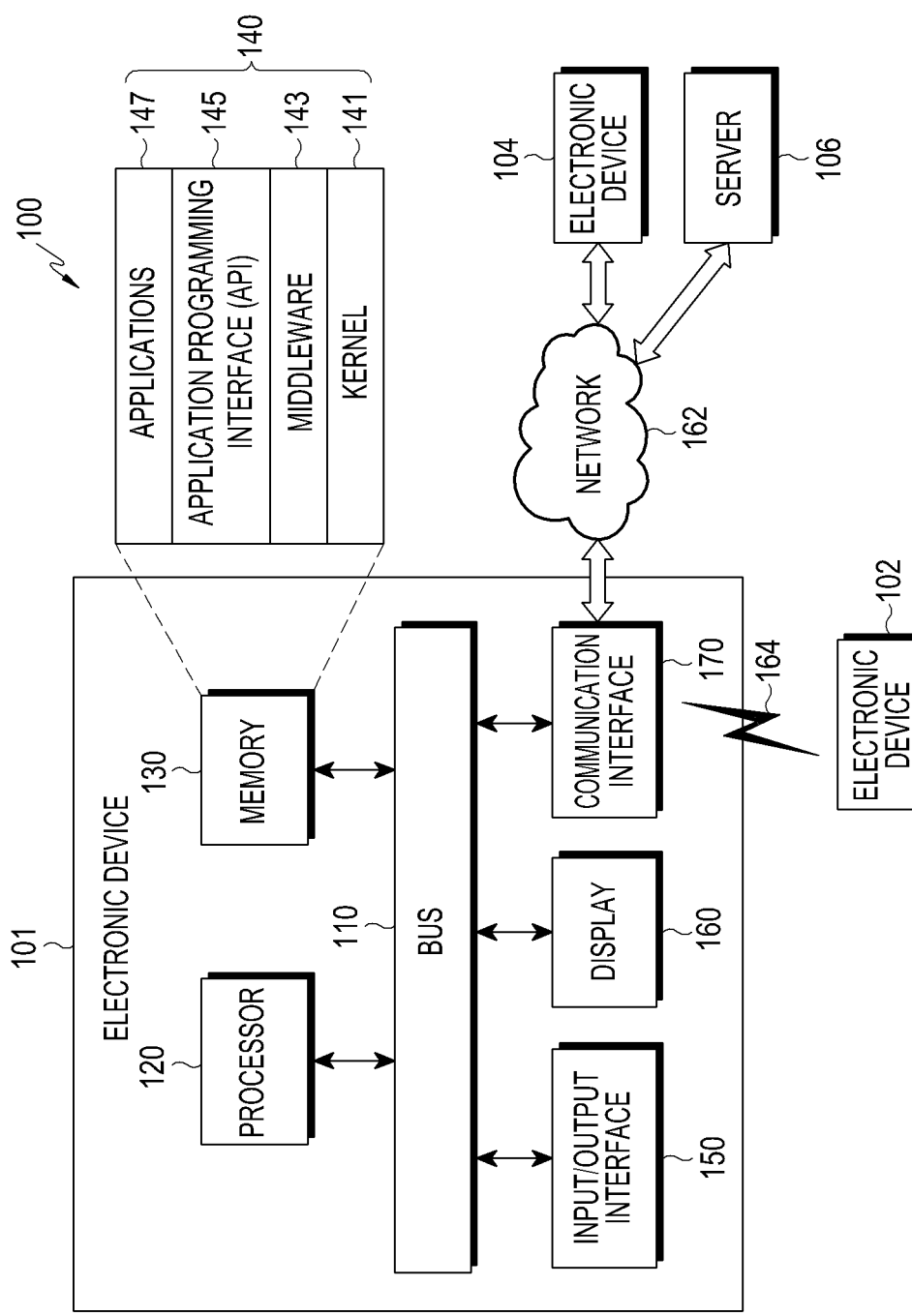
FIG. 1 illustrates a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CI) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 10:
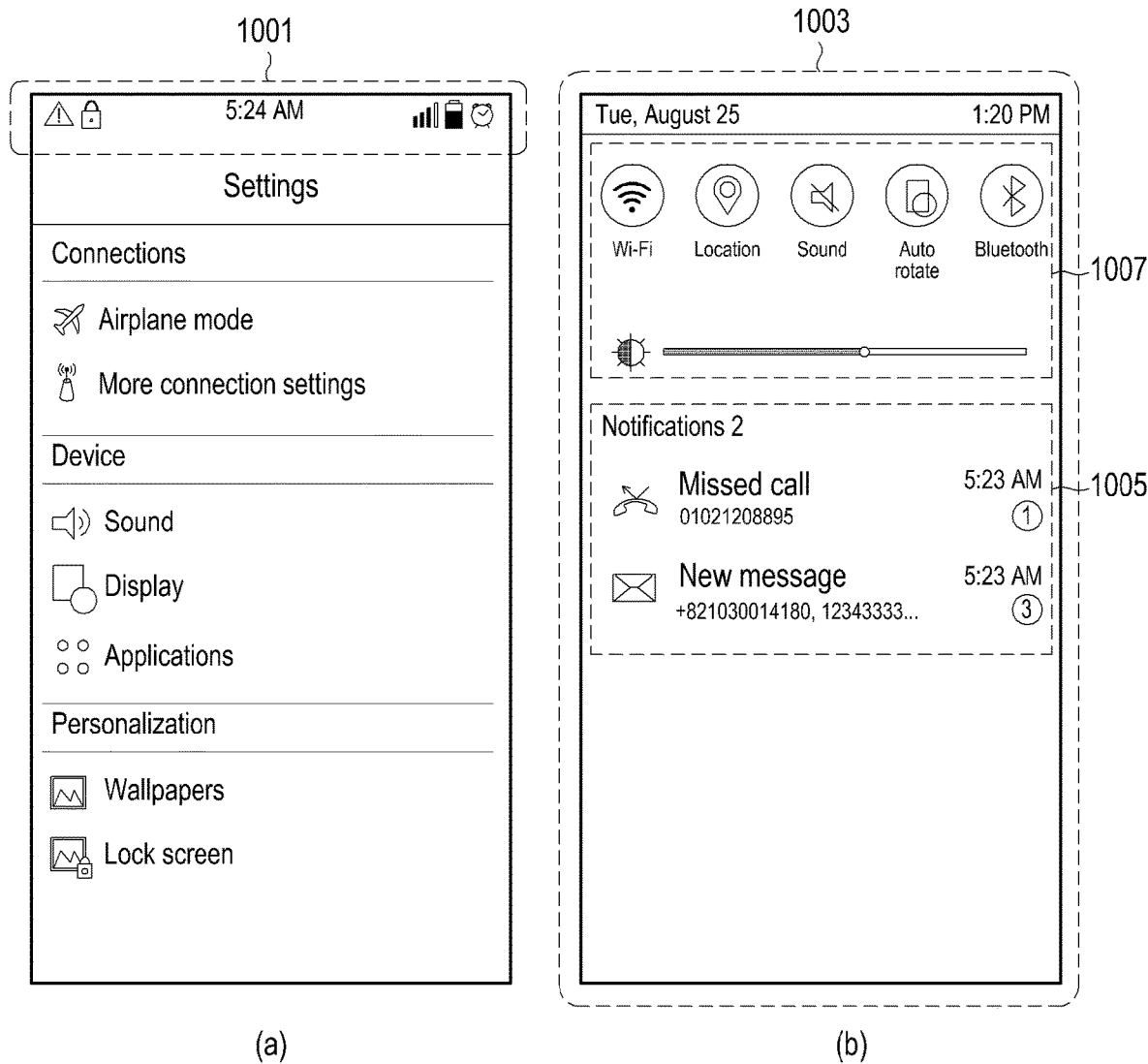
FIGS. 10 and 11 are diagrams illustrating examples of a screen displayed in an electronic device.

An electronic device may provide an indicator area 1001 that shows the state of the electronic device, as shown in FIG. 10A. The indicator area 1001 may display information, for example, a received signal strength indicator (RSSI), the amount of a charge remaining in a battery, notification information, or the like, so as to indicate the current state information of the electronic device to a user. When the user touches and drags the indicator area 1001 of the electronic device downwards, the electronic device may provide a notification panel area 1003 (or a quick panel area) and a quick setting area 1005, as illustrated in FIG. 10B. The notification panel area 1003 may additionally provide, to the user, event information related to a program installed in the electronic device. For example, when a predetermined event occurs in the electronic device, the electronic device may display information associated with the predetermined event in a list 1005 on the notification panel area 1003. The quick setting area 1007 may include various setting items in order to enable the user to quickly change the state of the electronic device, such as "Wi-Fi" for setting Wi-Fi, "location" for identifying location information of the electronic device, "sound" for controlling the sound of the electronic device, "auto rotate" for setting automatic screen rotation of the electronic device, "Bluetooth" for setting a Bluetooth function, and the like.

Figure 11:
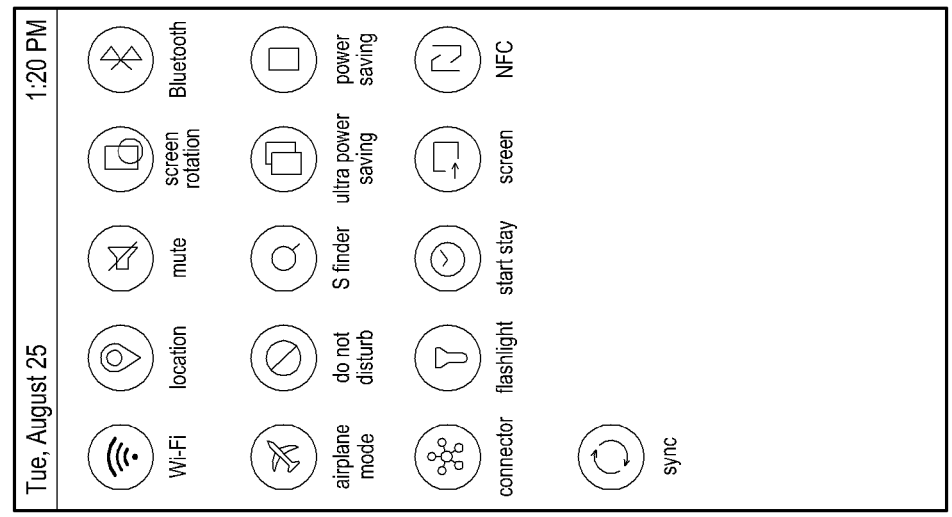
Figure 11:
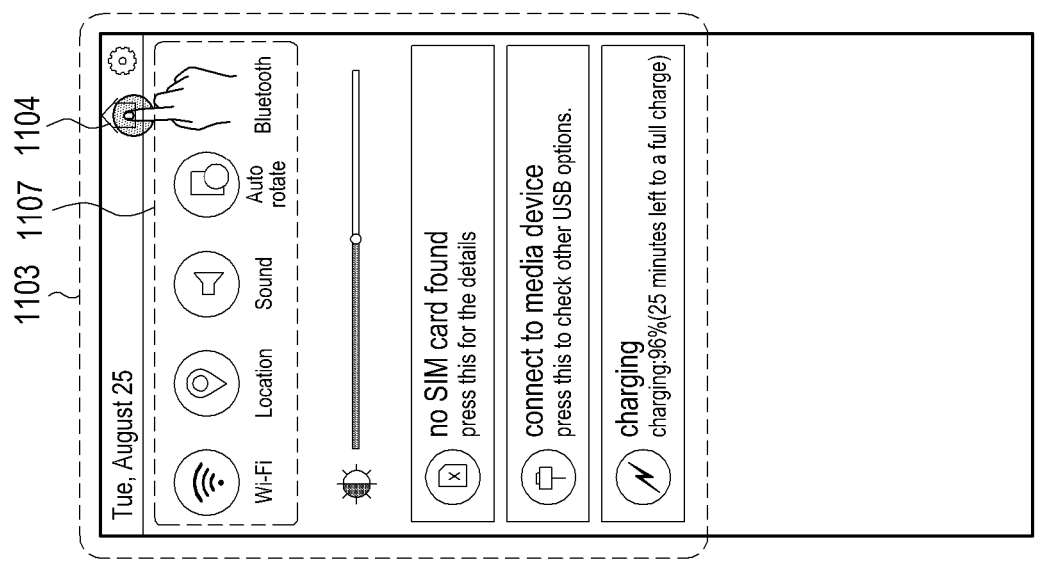
Figure 11:
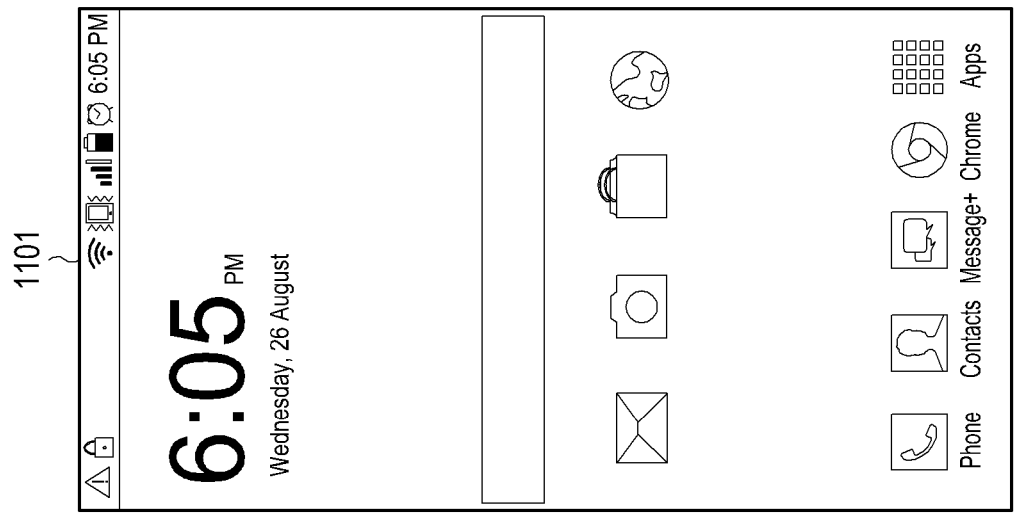
Figure 12:
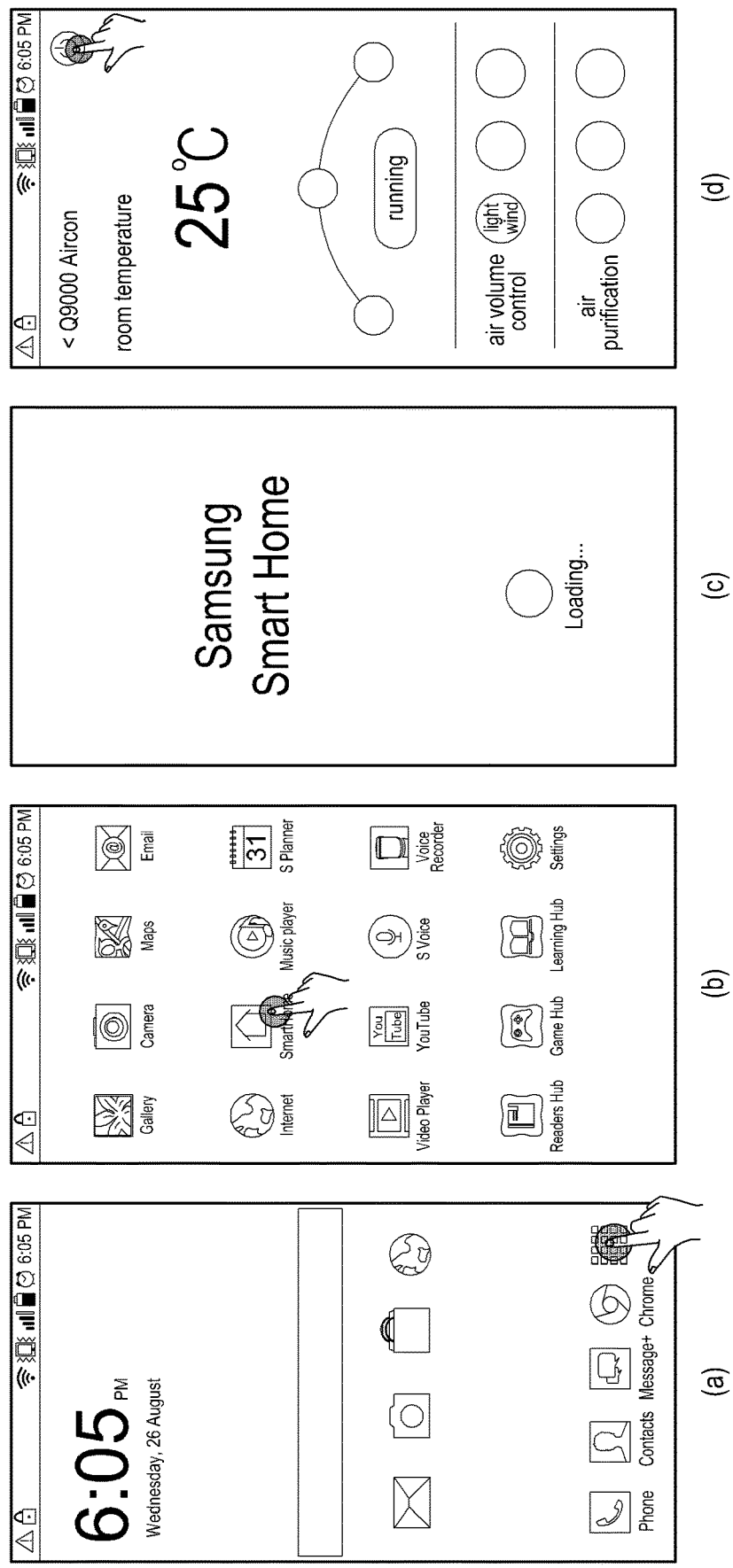
FIG. 12 is a diagram illustrating an example of an operation of executing an application installed in an electronic device.

Also, the user may add a setting item related to the current electronic device via an indicator area (e.g., the indicator area 1001) or a notification panel (e.g., the notification panel 1003). For example, via an indicator area 1101 (e.g., the indicator area 1001) in FIG. 11A, the user may arbitrarily add state information of the electronic device or an event. For example, as illustrated in FIG. 11B, a notification panel area 1103 (e.g., the notification panel area 1003) may include an editing icon 1104, and the electronic device may display the screen illustrated in FIG. 11C when the user selects the editing icon. Referring to FIG. 11C, various setting items may be provided such that a user may select items to be displayed in the quick setting area 1007. However, in FIG. 11C, only setting items related to the current state of the electronic device are provided, whereby a user may not additionally register predetermined information, for example, a setting item other than the items set in the current electronic device.

Also, when the electronic device desires to change the state or settings of a connected external electronic device, the electronic device may need to search for and execute a corresponding application installed in the electronic device, as shown in FIGS. 12A, 12B, 12C, and 12D.

Accordingly, hereinafter, various embodiments for controlling an external electronic device, such as identifying the state information of the external electronic device connected to an electronic device, changing the settings of the external electronic device, or the like, will be described with reference to FIGS. 1 to 9.

An electronic device 101 in a network environment 100 according to various embodiments will be described with reference to FIG. 1. The electronic device 101 may include a bus 110, a processor 120, a memory 130, an input/output interface 150 (or an input unit), a display 160, and a communication interface 170 (or a communication module). In some embodiments, the electronic device 101 may omit at least one of the elements, or may further include other elements.

The bus 110 may include, for example, a circuit which interconnects the elements 110 to 170 and forwards communication (e.g., a control message and/or data) between the elements 110 to 170.

The processor 120 may include one or more of a central processing unit (CPU), an application processor (AP), and a communication processor (CP). The processor 120, for example, may carry out operations or data processing relating to the control and/or communication of at least one other element of the electronic device 101.

Figure 2:
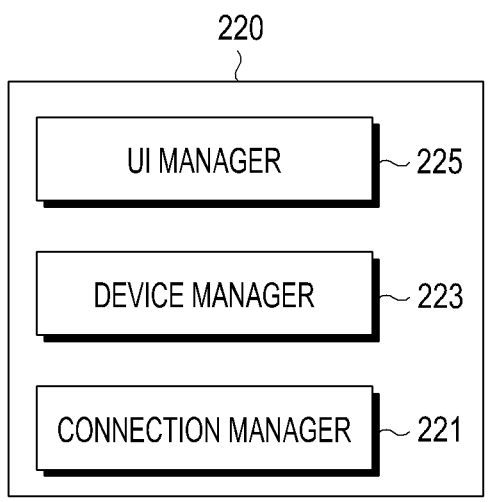
FIG. 2 is a block diagram illustrating a processor of an electronic device according to various embodiments.

Referring to FIG. 2, a processor 220 (e.g., the processor 120) may include a connection manager 221, a device manager 223, and a user interface (UI) manager 223.

The connection manager 221 may connect an electronic device (e.g., the electronic device 101) to at least one external electronic device (e.g., the electronic device 104) via a communication interface (e.g., the communication interface 170).

The connection manager 221 may identify and manage entity information of each of the at least one external electronic device. For example, the connection manager 221 may identify each external electronic device based on entity information of each of the at least one external electronic device.

The connection manager 221 may receive, from the at least one external electronic device, data information corresponding to at least one function of the external electronic device.

The at least one function may be 1 to N functions according to a data configuration agreed upon in advance between the electronic device and the external electronic device. The data information may be information based on a configuration agreed upon in advance between the electronic device and the external electronic device. The data information may include at least one from among the ID of the control item corresponding to the function, the label of the control item corresponding to the function, the data type of the control item corresponding to the function, and the range of a setting value of a component required according to the data type. The ID of the control item may be unique information used for identifying each item. The label of the control item may be character information desired to be written on a text label indicating each item. The data type of the control item corresponding to the function may be defined as bool, string, int, or the like, and the component type of the control item to be displayed may be automatically determined based on the data type. For example, when the data type of the control item is defined as the bool type, the component type of the control item may be determined to be a form that allows selecting on or off of the control item. In the case of the range of a setting value of a component required according to the data type, for example, when the data type of the control item is defined as int, the component type of the control item may be determined to be the form of a scroll bar. In this instance, the range of a setting value of a component required according to the data type may be the range of a setting value of the scroll bar.

The connection manager 221 may receive state information of the external electronic device, for example, state information corresponding to at least one function, from the at least one external electronic device. For example, when the at least one function is a function of controlling turning-on or turning-off of the external electronic device and the external electronic device is currently turned on, the state information may be information indicating that the external electronic device is currently in the on-state.

The device manager 223 may collect and/or manage the data information of the at least one external electronic device. For example, the device manager 223 may receive data information of the external electronic device via the connection manager 221, and may collect the data information of the external electronic device. Alternatively, the device manager 221 may collect data information of the external electronic device which is stored in advance in the electronic device.

The UI manager 225 may use data information transferred from the device manager 223 so as to configure a setting window for setting a user interface used for controlling the external electronic device, and may display the setting window on a display (e.g., the display 160).

For example, when at least one control item in the setting window displayed on the display 160 is selected via an input/output interface (e.g., the input/output interface 150), the UI manager 225 may generate a user interface corresponding to the selected control item, and may display the generated user interface on the display.

The control item may correspond to a function of the electronic device. For example, when the external electronic device is an air conditioner, the at least one control item may include a power-setting item for setting turning-on or turning-off of the air conditioner, a temperature-setting item for setting the temperature of the air conditioner, a wind-strength setting item for setting the wind strength of the air conditioner, or the like.

When the UI manager 225 receives, from the device manager 223, a signal indicating that data information registered in the external electronic device does not exist, the UI manager 225 may display, on a display, a UI basic configuration which enables only a signal associated with an operation of turning on or turning off the external electronic device to be processed. The UI basic configuration may be stored in a memory (e.g., the memory 130) of the electronic device.

The memory 130 may include a volatile and/or a non-volatile memory. The memory 130 may store, for example, commands or data relevant to at least one other element of the electronic device 101. For example, the memory 130 may store contacts. Also, for example, the memory 130 may store at least one contact and a name corresponding to the at least one contact. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, the memory 130, or the like) used for executing an operation or function implemented by other programs (e.g., the middleware 143, the API 145, or the application 147). Furthermore, the kernel 141 may provide an interface via which the middleware 143, the API 145, or the application programs 147 may access the individual elements of the electronic device 101 to control or manage system resources.

The middleware 143, for example, may serve as an intermediary for allowing the API 145 or the application programs 147 to communicate with the kernel 141 in order to exchange data.

Furthermore, the middleware 143 may process one or more task requests received from the application programs 147 according to priorities thereof. For example, the middleware 143 may assign priority to use the system resources (e.g., the bus 110, the processor 120, the memory 130, or the like) of the electronic device 101 to at least one of the application programs 147. For example, the middleware 143 may perform scheduling or load-balancing on the one or more task requests by processing the one or more task requests according to the priority assigned to the one or more application programs.

The API 145 is an interface via which the applications 147 control functions provided from the kernel 141 or the middleware 143, and may include, for example, at least one interface or function (e.g., instruction) for file control, window control, image processing, or text control.

The input/output interface 150 may serve as an interface that may transfer commands or data, input from a user or an external device, to another component(s) of the electronic device 101. For example, the input/output interface 150 may receive input corresponding to user input. Furthermore, the input/output interface 150 may output commands or data received from another element(s) of the electronic device 101 to a user or an external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may display, for example, various types of content (e.g., text, images, videos, icons, symbols, or the like) for a user. The display 160 may include a touch screen and may receive, for example, a touch input, a gesture input, a proximity input, or a hovering input using an electronic pen or the user's body part. Also, the display may be functionally connected to the electronic device 101.

The communication interface 170 may configure communication, for example, between the electronic device 101 and an external device (e.g., a first external electronic device 102, a second external electronic device 104, or a server 106). For example, the communication interface 170 may be connected to a network 162 via wireless or wired communication to communicate with the external device (e.g., the second external electronic device 104 or the server 106).

The wireless communication may use at least one from among, for example, long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like, as a cellular communication protocol. In addition, the wireless communication may include, for example, short-range communication 164. The short-range communication 164 may include at least one from among, for example, Wi-Fi, Bluetooth, near field communication (NFC), and global navigation satellite system (GNSS). The GNSS may include at least one from among, for example, a global positioning system (GPS), a global navigation satellite system (GLONASS), a BeiDou navigation satellite system (hereinafter referred to as "BeiDou"), and a European global satellite-based navigation system (Galileo), according to a use area, a bandwidth, or the like. Hereinafter, in the present disclosure, the term "GPS" may be interchangeably used with "GNSS". The wired communication may include, for example, at least one of a universal serial bus (USB), a high-definition multimedia interface (HDMI), recommended standard 232 (RS-232), a plain old telephone service (POTS), and the like. The network 162 may include at least one from among, for example, a communication network such as a computer network (e.g., a LAN or a WAN), the Internet, and a telephone network.

Each of the first and second external electronic devices 102 and 104 may be of a type that is the same as, or different from, that of the electronic device 101. According to an embodiment, the server 106 may include a group of one or more servers. According to various embodiments, all or some of the operations performed by the electronic device 101 may be performed by another electronic device or a plurality of electronic devices (e.g., the electronic devices 102 and 104 or the server 106). According to an embodiment, when the electronic device 101 has to perform a function or service automatically or in response to a request, the electronic device 101 may request another device (e.g., the electronic device 102 or 104, or the server 106) to perform at least some functions relating thereto, instead of, or additionally, performing the function or service by itself. Another electronic device (e.g., the electronic device 102 or 104, or the server 106) may execute the requested functions or the additional functions, and may deliver the result of execution thereof to the electronic device 101. The electronic device 101 may provide the received result as it is, or may additionally process the received result in order to provide the requested functions or services. To this end, for example, cloud-computing, distributed-computing, or client-server-computing technology may be used.

According to various embodiments, an electronic device (e.g., the electronic device 101) may include an input unit (e.g., the input/output interface 150), a communication unit (e.g., the communication interface 170), a display (e.g., the display 160), and a processor (e.g., the processor 120), which may receive, from an external electronic device connected via the communication unit, data information corresponding to at least one function of the external electronic device, may display, on the display, a setting window for setting a user interface for controlling the external electronic device using the data information, may select a control item, which corresponds to the at least one function and is included in the setting window, according to user input received via the input unit, and may set the user interface corresponding to the selected control item and display the user interface on the display.

According to various embodiments, the processor may display, on the display, an external electronic device list connectable to the electronic device, and when user input for selecting the external electronic device from the displayed external electronic device list is received via the input unit, may perform control so as to establish a connection to the external electronic device via the communication unit and to receive the data information from the external electronic device.

According to various embodiments, the processor may display, on the display, a screen for selecting whether to establish a connection to the external device when user input for selecting the external electronic device from the displayed external electronic device list is received via the input unit, and may establish a connection to the external electronic device via the communication unit when input for selecting the connection to the external device is received via the input unit.

According to various embodiments, the data information may include at least one from among an ID of the control item corresponding to the function, a label of the control item corresponding to the function, a data type of the control item corresponding to the function, and a range of a setting value of a component required according to the data type.

According to various embodiments, the processor may generate the control item, which corresponds to the at least one function and is to be displayed in at least one of a first area and a second area of the display, using the data information, and may include the generated control item in the setting window.

According to various embodiments, the setting window may include a first setting area corresponding to the first area and a second setting area corresponding to the second area.

According to various embodiments, the setting window may further include a third setting area for setting an icon indicating the external device.

According to various embodiments, the processor may perform control so as to receive state information corresponding to the function of the external electronic device from the external electronic device via the communication unit.

According to various embodiments, the processor may display the selected control item in which the state information is reflected.

According to various embodiments, the processor may transmit a signal for controlling the function corresponding to the control item to the external electronic device via the communication unit when user input for controlling the control item of the user interface is received via the input unit.

Figure 3:
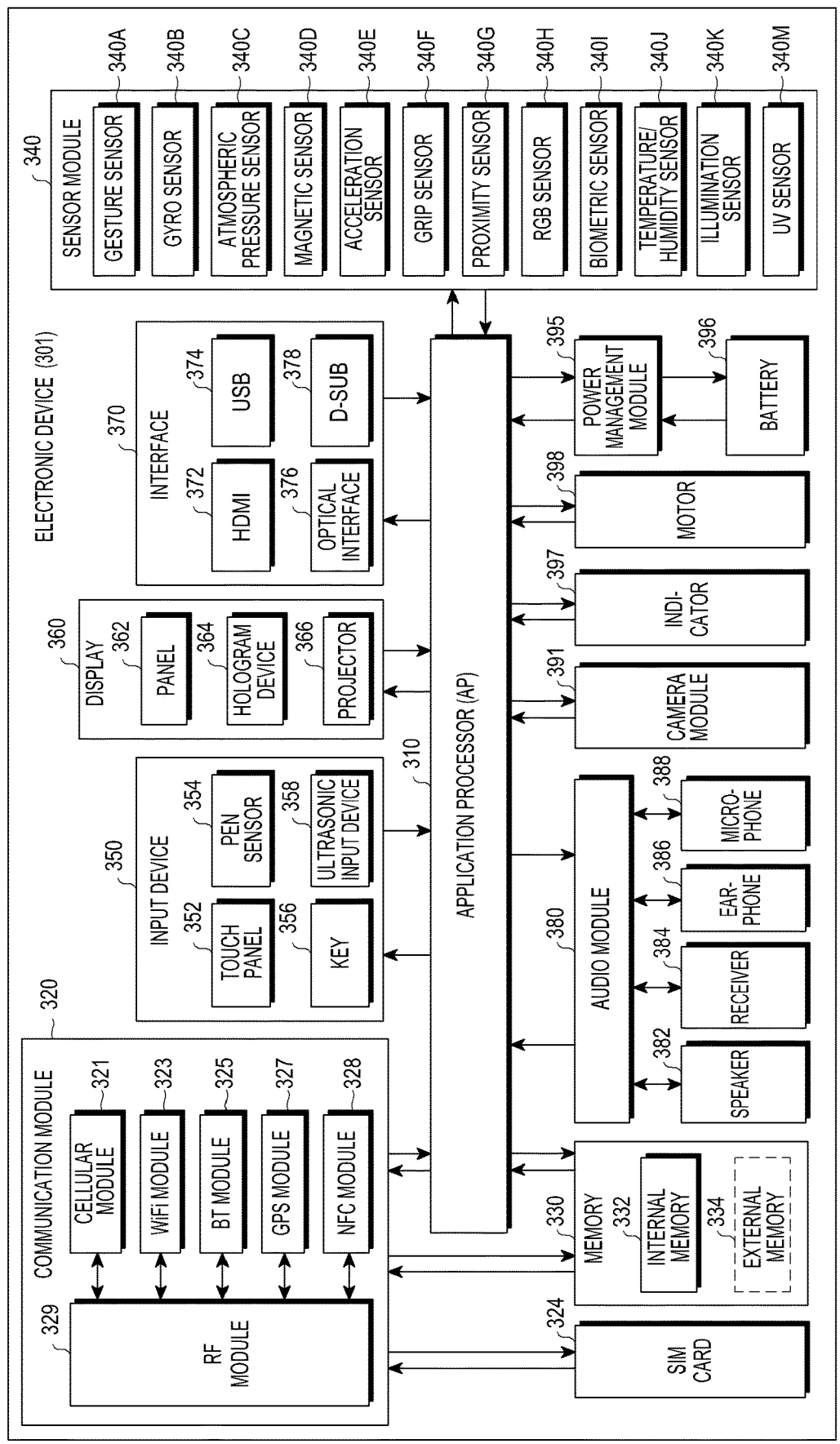
FIG. 3 is a block diagram illustrating an electronic device according to various embodiments.

FIG. 3 is a block diagram illustrating an electronic device 301 according to various embodiments. The electronic device 301 may include, for example, all or part of the electronic device 101 illustrated in FIG. 1. The electronic device 301 may include one or more processors (e.g., application processor (AP)) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto, and may perform various data processing and operations by driving an operating system or an application program. The processor 310 may be implemented, for example, as a system on chip (SoC). According to an embodiment, the processor 310 may further include a graphic processing unit (GPU) and/or an image signal processor. The processor 310 may also include at least some (e.g., a cellular module 321) of the elements illustrated in FIG. 3. The processor 310 may load, into a volatile memory, commands or data received from at least one (e.g., a nonvolatile memory) of the other elements, may process the loaded commands or data, and may store various data in the nonvolatile memory.

The communication module 320 may have a configuration that is the same as or similar to that of the communication interface 170 of FIG. 1. The communication module 320 may include, for example, a cellular module 321, a Wi-Fi module 323, a Bluetooth module 325, a GNSS module 327 (e.g., a GPS module, a GLONASS module, a BeiDou module, or a Galileo module), an NFC module 328, and a radio frequency (RF) module 329.

The cellular module 321 may provide, for example, a voice call, a video call, a text message service, an Internet service, or the like via a communication network. According to an embodiment, the cellular module 321 may identify or authenticate the electronic device 301 in the communication network using the subscriber identification module (e.g., a subscriber identity module (SIM) card) 324. According to an embodiment, the cellular module 321 may perform at least some of the functions that the processor 310 may provide. According to an embodiment, the cellular module 321 may include a communication processor (CP).

Each of the Wi-Fi module 323, the Bluetooth module 325, the GNSS module 327, or the NFC module 328 may include, for example, a processor for processing data transmitted and received via a corresponding module. In some embodiments, at least some (two or more) from among the cellular module 321, the Wi-Fi module 323, the Bluetooth module 325, the GNSS module 327, and the NFC module 328 may be included in a single Integrated Chip (IC) or IC package.

The RF module 329 may transmit and receive, for example, a communication signal (e.g., an RF signal). The RF module 329 may include, for example, a transceiver, a power amplifier module (PAM), a frequency filter, a low-noise amplifier (LNA), an antenna, or the like. According to another embodiment, at least one of the cellular module 321, the Wi-Fi module 323, the Bluetooth module 325, the GNSS module 327, and the NFC module 328 may transmit and receive an RF signal via a separate RF module.

The subscriber identification module 324 may include, for example, a card including a subscriber identification module and/or an embedded SIM, and may contain unique identification information (e.g., an integrated circuit card identifier (ICCID)) or subscriber information (e.g., an international mobile subscriber identity (IMSI)).

The memory 330 (e.g., the memory 130) may include, for example, an embedded memory 332 or an external memory 334. The embedded memory 332 may include at least one of, for example, a volatile memory (e.g., a dynamic RAM (DRAM), a static RAM (SRAM), a synchronous dynamic RAM (SDRAM), or the like) and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a solid-state drive (SSD).

The external memory 334 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 334 may be functionally and/or physically connected to the electronic device 301 via various interfaces.

The sensor module 340 may, for example, measure a physical quantity or detect the operating state of the electronic device 301, and may convert the measured or detected information into an electrical signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a Red, Green, and Blue (RGB) sensor), a biometric sensor 340I, a temperature/humidity sensor 340J, an illumination sensor 340K, and an ultraviolet (UV) sensor 340M. Additionally or alternatively, the sensor module 340A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 340 may further include a control circuit for controlling one or more sensors included therein. In some embodiments, the electronic device 301 may further include a processor, which is configured to control the sensor module 340, as a part of the processor 310 or separately from the processor 310, so as to control the sensor module 340 while the processor 310 is in a sleep state.

The input device 350 may include, for example, a touch panel 352, a (digital) pen sensor 354, a key 356, and an ultrasonic input unit 358. The touch panel 352 may be, for example, at least one of a capacitive type, a resistive type, an infrared type, and an ultrasonic type. Furthermore, the touch panel 352 may further include a control circuit. The touch panel 352 may further include a tactile layer to provide a tactile reaction to a user.

The (digital) pen sensor 354 may include, for example, a recognition sheet which is a part of a touch panel or is separate from a touch panel. The key 356 may include, for example, a physical button, an optical key, or a keypad. The ultrasonic input device 358 may detect ultrasonic waves, which are generated by an input tool, via a microphone (e.g., a microphone 388) to identify data corresponding to the detected ultrasonic waves.

The display 360 (e.g., the display 160) may include a panel 362, a hologram device 364, or a projector 366. The panel 362 may have a configuration that is the same as, or similar to, that of the display 160 illustrated in FIG. 1. The panel 362 may be implemented to be, for example, flexible, transparent, or wearable. The panel 362 and the touch panel 352 may be formed as a single module. The hologram device 364 may show a three-dimensional image in the air using light interference. The projector 366 may display an image by projecting light onto a screen. The screen may be located, for example, in the interior of, or on the exterior of, the electronic device 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-sub-miniature (D-sub) interface 378. The interface 370 may be included in, for example, the communication interface 170 illustrated in FIG. 1. Additionally or alternatively, the interface 370 may include, for example, a mobile high-definition link (MHL) interface, a secure digital (SD) card/multi-media card (MMC) interface, or an infrared data association (IrDA) standard interface.

The audio module 380 may bilaterally convert, for example, a sound and an electric signal. At least some elements of the audio module 380 may be included in, for example, the input/output interface 145 illustrated in FIG. 1. The audio module 380 may process voice information input or output via, for example, a speaker 382, a receiver 384, earphones 386, the microphone 388, or the like.

The camera module 391 is a device which may photograph a still image and a video. According to an embodiment, the camera module 391 may include one or more image sensors (e.g., a front sensor or a back sensor), a lens, an image signal processor (ISP), or a flash (e.g., an LED, a xenon lamp, or the like).

The power management module 395 may manage, for example, the power of the electronic device 301. According to an embodiment, the power management module 395 may include a power management integrated circuit (PMIC), a charger integrated circuit (IC), or a battery or fuel gauge. The PMIC may have a wired and/or wireless charging scheme. The wireless charging method may include, for example, a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 396 and a voltage, current, or temperature while charging. The battery 396 may include, for example, a rechargeable battery and/or a solar battery.

The indicator 397 may display a particular state, for example, a booting state, a message state, a charging state, or the like of the electronic device 301 or a part (e.g., the processor 310) of the electronic device 301. The motor 398 may convert an electric signal into mechanical vibration, and may generate vibration, a haptic effect, or the like. Although not illustrated, the electronic device 301 may include a processing unit (e.g., a GPU) for supporting mobile television (TV). The processing device for supporting mobile TV may process, for example, media data according to a standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 4:
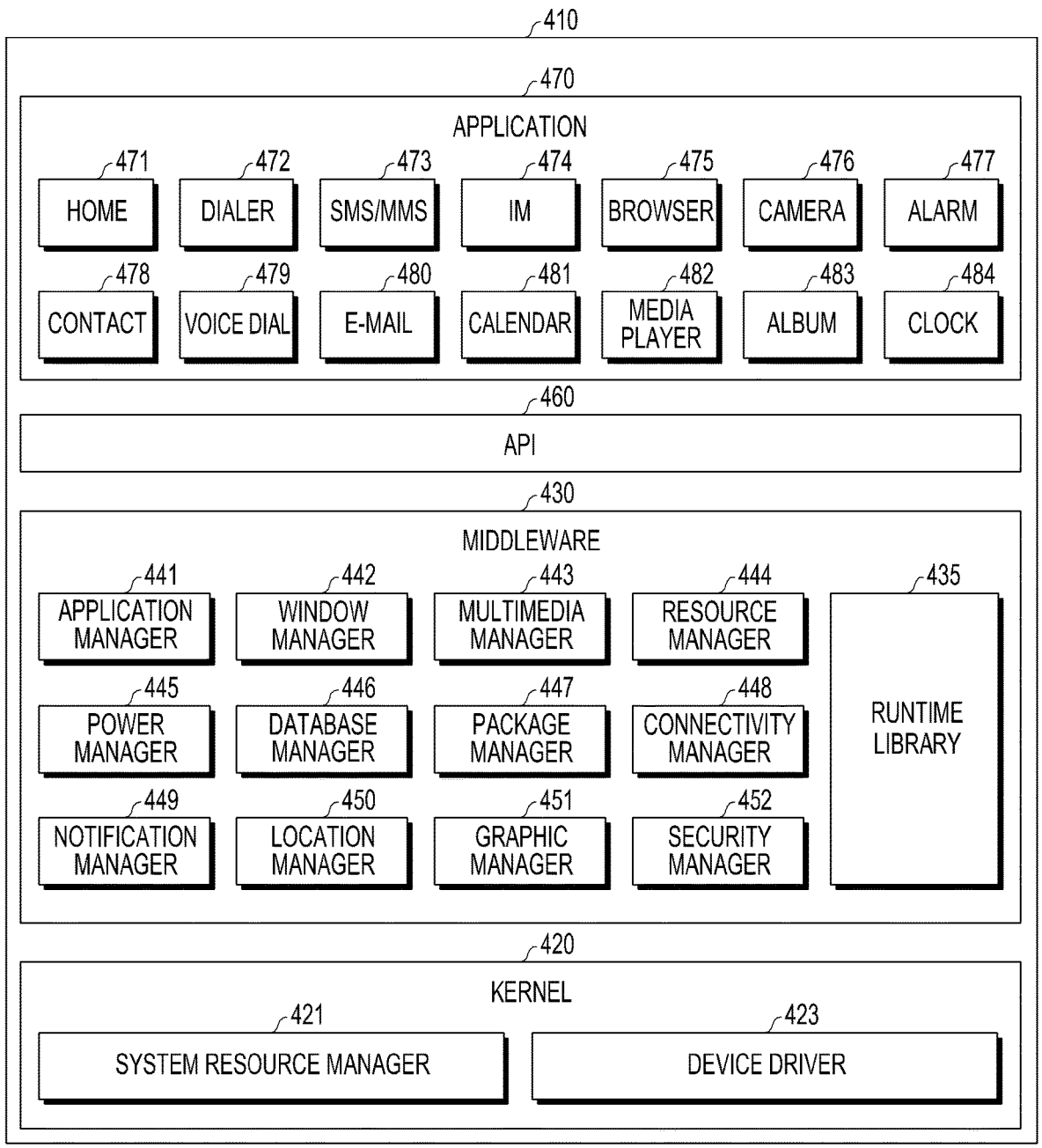
FIG. 4 is a block diagram of a program module according to various embodiments.

FIG. 4 is a block diagram of a program module according to various embodiments. According to an embodiment, the program module 410 (e.g., the program 140) may include an operating system (OS) that controls resources relating to an electronic device (e.g., the electronic device 101) and/or various applications (e.g., the application programs 147) running on the operating system. The operating system may be, for example, Android, iOS, Windows, Symbian, Tizen, Bada, or the like.

The program module 410 may include a kernel 420, middleware 430, an application programming interface (API) 460, and/or an application 470. At least some of the program module 410 may be preloaded on an electronic device, or may be downloaded from an external electronic device (e.g., the electronic device 102 or 104, or the server 106).

The kernel 420 (e.g., the kernel 141) may include, for example, a system resource manager 421 and/or a device driver 423. The system resource manager 421 may control, allocate, or retrieve system resources. According to an embodiment, the system resource manager 421 may include a process management unit, a memory management unit, a file-system management unit, or the like. The device driver 423 may include, for example, a display driver, a camera driver, a Bluetooth driver, a shared memory driver, a USB driver, a keypad driver, a Wi-Fi driver, an audio driver, or an inter-process communication (IPC) driver.

The middleware 430 may provide a function required by the applications 470 in common, or may provide various functions to the applications 470 via the API 460 so that the applications 470 may efficiently use the limited system resources within the electronic device. According to an embodiment, the middleware 430 (e.g., the middleware 143) may include, for example, at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include, for example, a library module that a compiler uses in order to add a new function via a programming language while the applications 470 are being executed. The runtime library 435 may perform functions that are related to the management of input and output, the management of memory, arithmetic functions, and the like.

The application manager 441 may manage, for example, the life cycle of at least one of the applications 470. The window manager 442 may manage GUI resources used for a screen. The multimedia manager 443 may determine formats required for reproducing various media files, and may encode or decode a media file using a coder/decoder (codec) suitable for the corresponding format. The resource manager 444 may manage resources, such as source code, memory, storage space, and the like of at least one of the applications 470.

The power manager 445 may operate together with, for example, a basic input/output system (BIOS) to manage a battery or power, and may provide power information required for the operation of the electronic device. The database manager 446 may generate, search for, or change a database to be used by at least one of the applications 470. The package manager 447 may manage the installation or update of an application that is distributed in the form of a package file.

The connectivity manager 448 may manage wireless connection, for example, Wi-Fi, Bluetooth, or the like. The notification manager 449 may display or report an event, such as an arrival message, an appointment, a proximity notification, or the like, in such a manner as not to disturb a user. The location manager 450 may manage location information of the electronic device. The graphic manager 451 may manage graphic effects to be provided to a user or user interfaces related to the graphic effects. The security manager 452 may provide all security functions required for system security, user authentication, or the like. According to an embodiment, when the electronic device (e.g., the electronic device 101) has a telephony function, the middleware 430 may further include a telephony manager that manages a voice or video call function of the electronic device.

The middleware 430 may include a middleware module for forming a combination of various functions of the aforementioned elements. The middleware 430 may provide a module specified for each type of operating system in order to provide a differentiated function. Also, the middleware 430 may dynamically delete some existing elements, or may add new elements.

The API 460 (e.g., the API 145) is, for example, a set of API programming functions, and may be provided in a different configuration depending on the operating system. For example, in the case of Android or iOS, one API set may be provided for each platform. In the case of Tizen, two or more API sets may be provided for each platform.

The applications 470 (e.g., the application programs 147) may include one or more applications that can perform functions, for example, home 471, a dialer 472, SMS/MMS 473, an instant message (IM) 474, a browser 475, a camera 476, an alarm 477, contacts 478, a voice dial 479, an e-mail 480, a calendar 481, a media player 482, an album 483, a clock 484, health care (e.g., measuring exercise quantity or blood sugar), and environment information (e.g., providing atmospheric pressure, humidity, temperature information, and the like).

According to an embodiment, the applications 470 may include an application (hereinafter, referred to as an "information exchange application" for ease of description) that supports the exchange of information between an electronic device (e.g., the electronic device 101) and an external electronic device (e.g., the electronic device 102 or 104). The information exchange application may include, for example, a notification relay application for transferring predetermined information to an external electronic device or a device management application for managing an external electronic device.

For example, the notification relay application may include a function of transferring, to an external electronic device (e.g., the electronic device 102 or 104), notification information generated from other applications of the electronic device (e.g., an SMS/MMS application, an e-mail application, a health management application, an environmental information application, or the like). Furthermore, the notification relay application, for example, may receive notification information from an external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some elements thereof) or a function of adjusting the brightness (or resolution) of a display), applications that operate in the external electronic device, or services (e.g., a call service, a message service, or the like) that are provided by the external electronic device.

According to an embodiment, the applications 470 may include applications (e.g., a health care application of a mobile medical appliance, or the like) designated according to the attributes of an external electronic device (e.g., the electronic device 102 or 104). According to an embodiment, the applications 470 may include applications received from an external electronic device (e.g., the server 106 or the electronic device 102 or 104). According to an embodiment, the applications 470 may include a preloaded application or a third-party application that may be downloaded from a server. The names of the elements of the program module 410 of the illustrated embodiment may be changed depending on the type of operating system.

According to various embodiments, at least a part of the programming module 410 may be implemented as software, firmware, hardware, or a combination of two or more thereof. At least a part of the program module 410 may be implemented (e.g., executed) by, for example, a processor (e.g., the processor 210). At least a part of the programming module 410 may include, for example, a module, a program, a routine, sets of instructions, a process, or the like for performing one or more functions.

Figure 5:
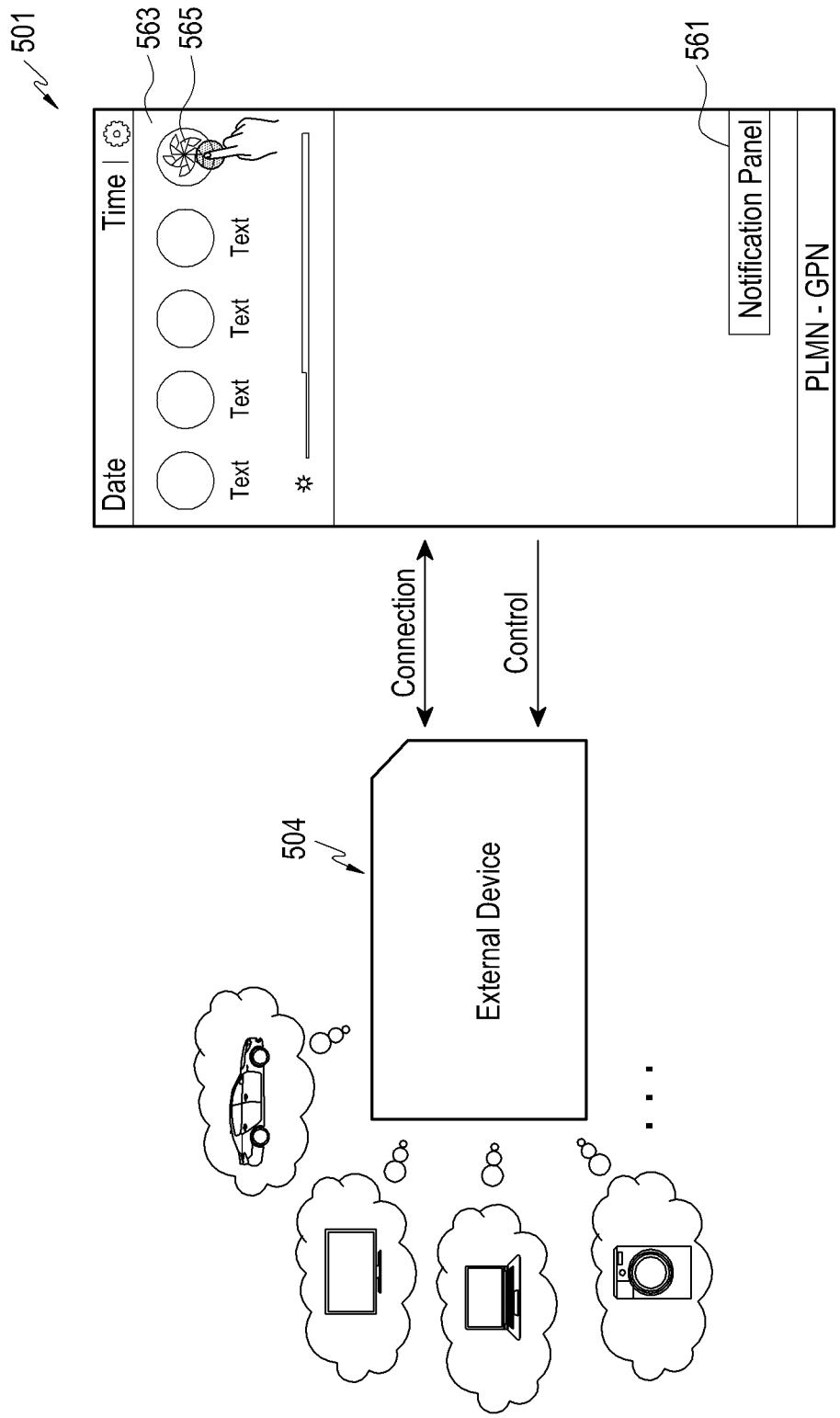
FIG. 5 is a diagram illustrating an operation of controlling an external electronic device by an electronic device according to various embodiments.

FIG. 5 is a diagram illustrating an operation of controlling an external electronic device 504 (e.g., the electronic device 104) by an electronic device 505 (e.g., the electronic device 101) according to various embodiments. Referring to FIG. 5, when the electronic device 501 is connected to at least one external electronic device 504 (e.g., a vehicle, a TV, a notebook, a washing machine, or the like), the electronic device 501 may display a user interface 565 for controlling the external electronic device 504 in a quick setting area 563 of a notification panel area 561 of the electronic device 501. A user utilizes the displayed user interface 565 in order to quickly control the external electronic device 504.

According to various embodiments, a method of controlling an external electronic device (e.g., the electronic device 104) by an electronic device (e.g., the electronic device 101) may include: receiving, from an external electronic device connected to the electronic device, data information corresponding to at least one function of the external electronic device; displaying a setting window for setting a user interface for controlling the external electronic device using the data information; selecting a control item corresponding to the at least one function included in the setting window according to reception of user input; and setting and displaying the user interface corresponding to the selected control item.

According to various embodiments, the operation of receiving the data information corresponding to the at least one function of the external electronic device from the external electronic device connected to the electronic device may include: displaying a list of external electronic devices connectable to the electronic device; and receiving the data information from the external electronic device via connection to the external electronic device when user input of selecting the external electronic device from the displayed external electronic device list is received.

According to various embodiments, the operation of receiving the data information from the external electronic device via the connection to the external electronic device may include: displaying a screen for selecting whether to establish a connection to the external device when the user input for selecting the external electronic device is received; and establishing a connection to the external electronic device when user input of selecting the connection to the electronic device is received.

According to various embodiments, the data information may include at least one from among an ID of the control item corresponding to the function, a label of the control item corresponding to the function, a data type of the control item corresponding to the function, and a range of a setting value of a component required according to the data type.

According to various embodiments, the operation of displaying the setting window may include: generating, using the data information, the control item which corresponds to the at least one function and is to be displayed in one of a first area and a second area of a display of the electronic device; and including the generated control item in the setting window.

According to various embodiments, the setting window may include a first setting area corresponding to the first area, and a second setting area corresponding to the second area.

According to various embodiments, the setting window may further include a third setting area for setting an icon indicating the external device.

According to various embodiments, the method may further include receiving state information corresponding to the function of the external electronic device from the external electronic device.

According to various embodiments, the operation of setting and displaying the user interface corresponding to the selected control item may include displaying the selected control item to which the state information is reflected.

According to various embodiments, the method may further include transmitting a signal for controlling the function corresponding to the control item to the external electronic device when user input for controlling the control item of the displayed user interface is received.

Figure 6:
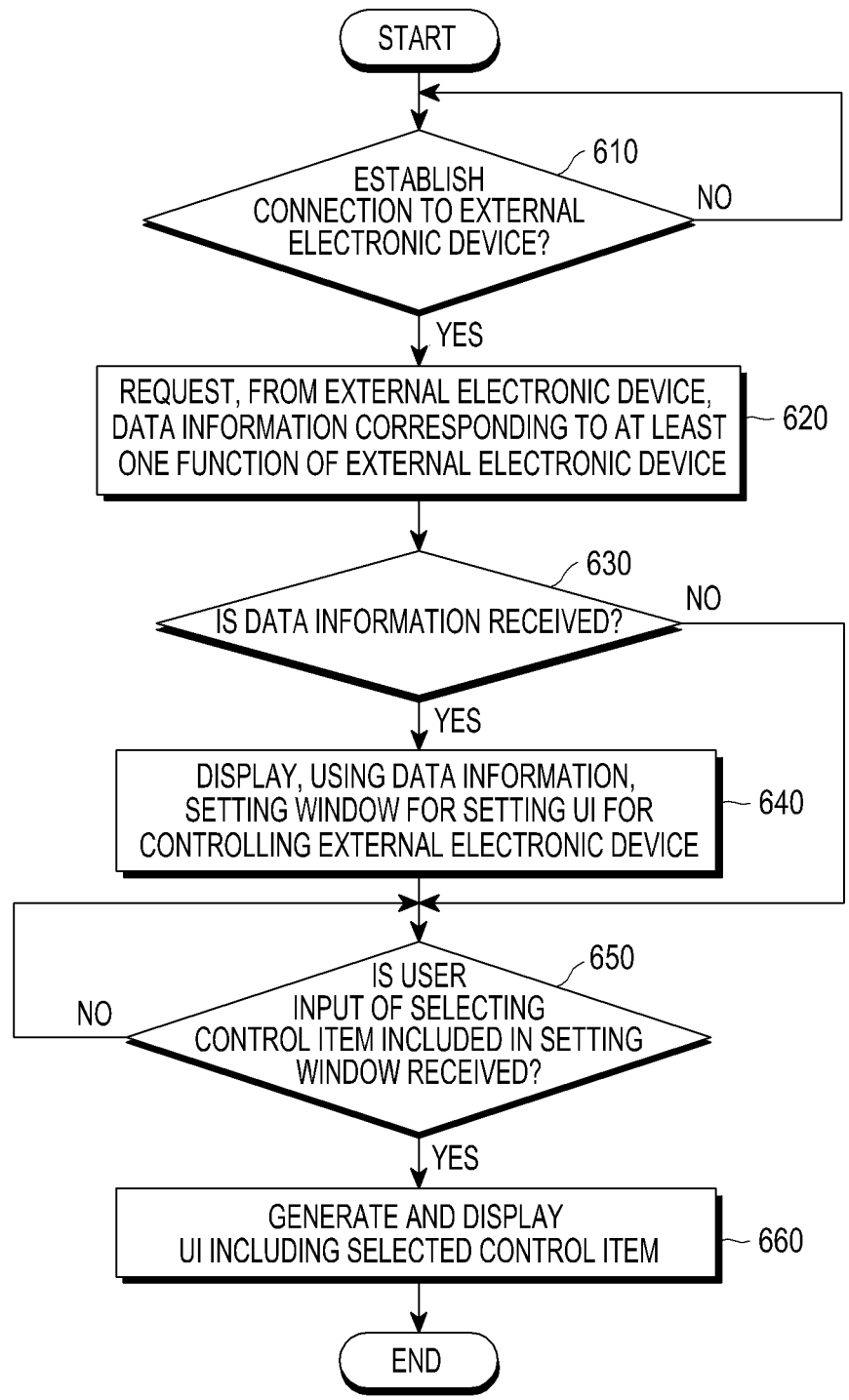
FIG. 6 is a flowchart illustrating an operation of controlling an external electronic device by an electronic device according to various embodiments.

FIG. 6 is a flowchart illustrating an operation of controlling an external electronic device (e.g., the electronic device 104) by an electronic device (e.g., the electronic device 101) according to various embodiments. FIGS. 7A to 7F are diagrams illustrating control of an external electronic device (e.g., the electronic device 104) by an electronic device (e.g., the electronic device 101) according to various embodiments.

In operation 610, an electronic device may determine whether to establish a connection to an external electronic device. When the electronic device determines to establish the connection to the external electronic device in operation 610, the electronic device may proceed with operation 620. Otherwise, the electronic device proceeds with operation 610 again.

Figure 7A:
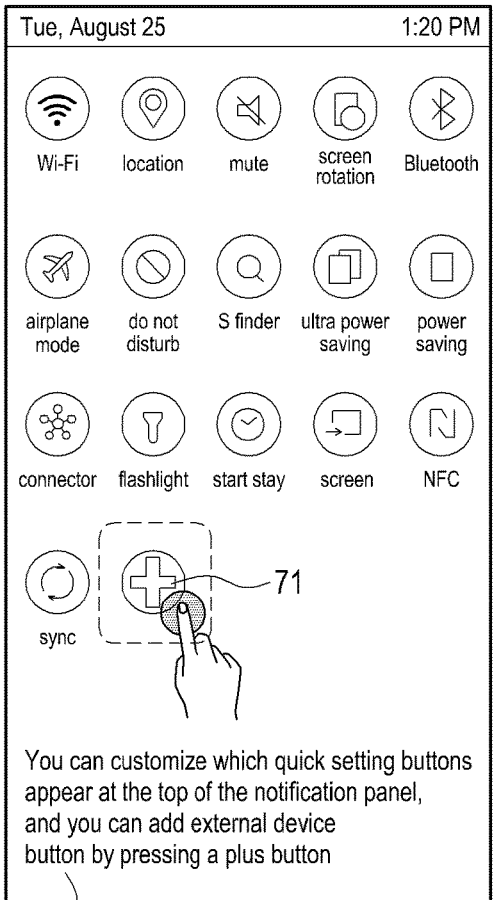

When a quick setting menu (not illustrated) in a notification panel area (not illustrated) of the electronic device is selected according to reception of user input (e.g., touch input), the electronic device (e.g., the electronic device 101) may display a setting screen 761 of FIG. 7A.

The setting screen 761 may include a first icon 71 for adding an external electronic device. In response to user input (e.g., touch input), the electronic device may select the first icon 71. Also, in response to user input, the electronic device may display information associated with the first icon 71, for example, information 72 indicating that the first icon 71 is used for adding an external electronic device.

Figure 7B:
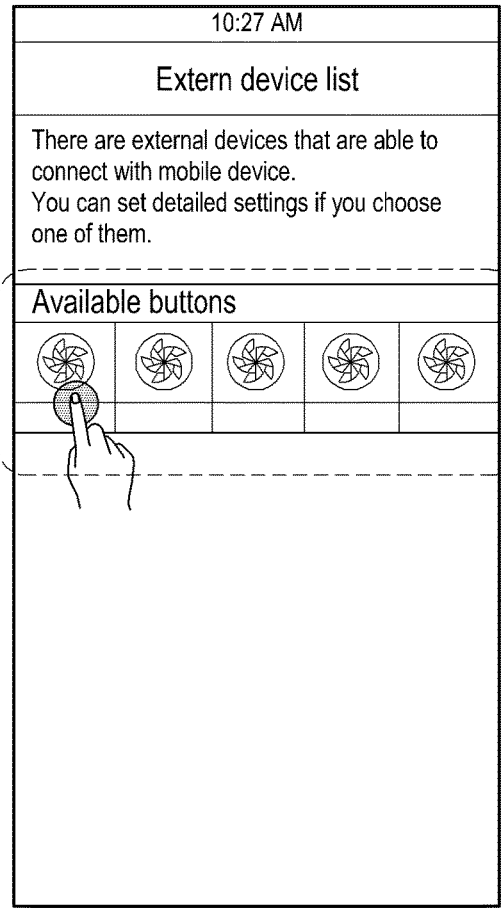

When the first icon 71 is selected, the electronic device may display an external electronic device list 73 including external electronic devices connectable to the electronic device, as illustrated in FIG. 7B. The external electronic device list 73 may be displayed in the form in which icons corresponding to connectable external electronic devices are displayed, as illustrated in FIG. 7B.

Figure 7C:
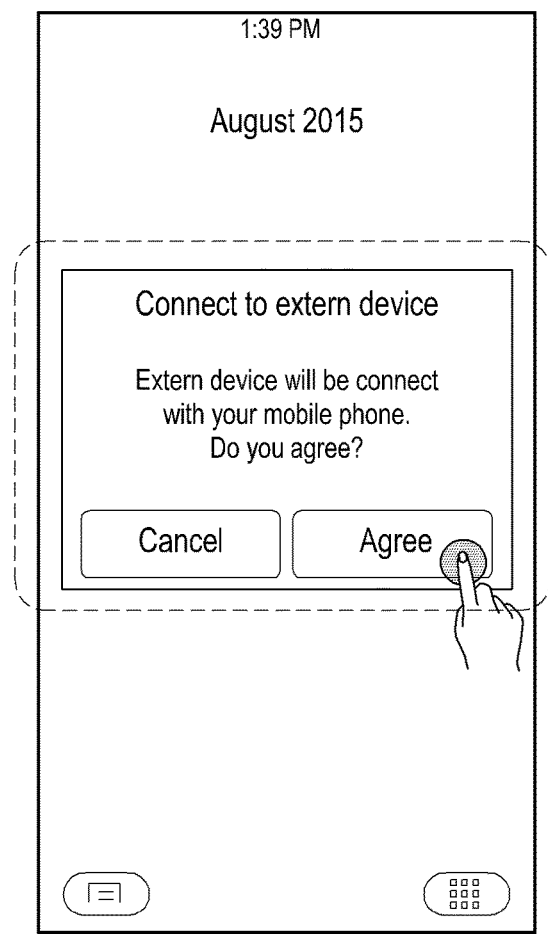

When an icon 74 corresponding to an external electronic device to be connected is selected as illustrated in FIG. 7B according to reception of user input, a popup-window may be displayed, asking whether to establish a connection to the selected external electronic device, and to enable the user to select "cancel" or "agree" as illustrated in FIG. 7C. Based on whether "cancel" or "agree" is selected, the electronic device may proceed with operation 620 of FIG. 6, or may proceed with operation 610 again. For example, when "cancel" of FIG. 7C is selected, the connection to the selected external electronic device may not be established. Also, the setting screen 761 of FIG. 7A may be displayed, the external electronic device list 73 of FIG. 7B may be displayed, or a home screen of the electronic device may be displayed. For example, when "agree" is selected as illustrated in FIG. 7C, the electronic device may execute operation 620 of FIG. 6.

Various forms may be used for asking whether to establish the connection to the selected external electronic device, in addition to the pop-up window of FIG. 7C.

In operation 620, the electronic device may request, from the external electronic device, data information corresponding to at least one function of the external electronic device.

The data information may include at least one from among the ID of the control item corresponding to the function, the label of the control item corresponding to the function, the data type of the control item corresponding to the function, and the range of a setting value of a component required according to the data type. Each item included in the data information has already been described, and thus descriptions thereof will be omitted.

In operation 630, the electronic device may determine whether the data information of the external electronic device is received from the external electronic device. When the electronic device determines that the data information is received in operation 630, the electronic device may proceed with operation 640. Otherwise, the electronic device may terminate the operation of the electronic device.

In operation 640, the electronic device may display a setting window for setting a UI used for controlling the external electronic device using the received data information.

The basic frame of the setting window may be stored in a memory (e.g., the memory 130) of the electronic device, or may be received from the external electronic device.

The basic frame of the setting window may include at least one from among a first setting area, a second setting area, and a third setting area. The first setting area is an area corresponding to a first area of the electronic device, and may be an area for generating a UI to be displayed in the first area. The second setting area is an area corresponding to a second area of the electronic device, and may be an area for generating a UI to be displayed in the second area. The third setting area may be an area for setting an icon indicating an external electronic device. For example, the third setting area may be an area for setting an icon that represents an external electronic device and is to be displayed in the first area and/or second area of the electronic device.

Figure 7D:
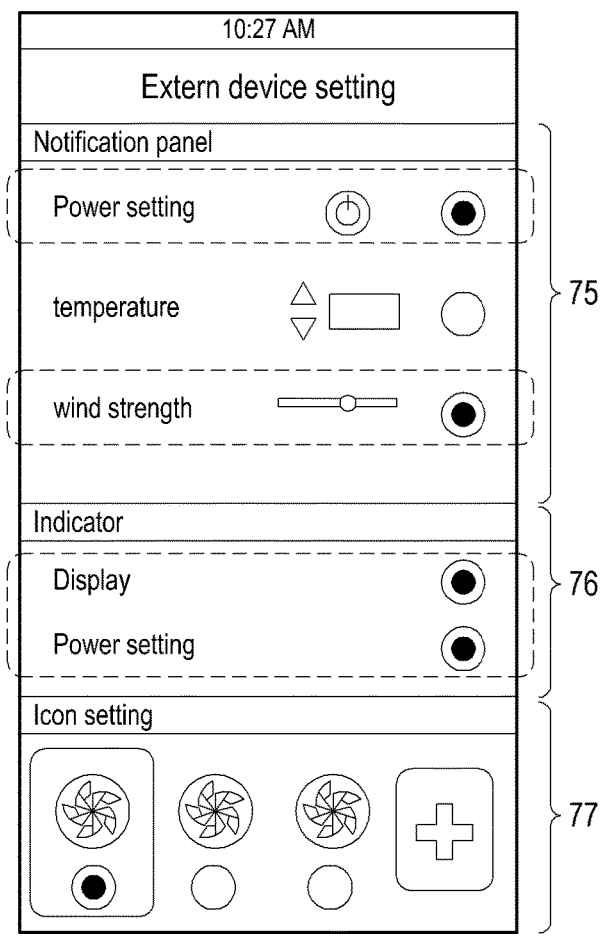

Referring to FIG. 7D, the setting window may include a first setting area 75, a second setting area 76, and a third setting area 77.

The first setting area 75 may be an area for generating UI for controlling the external electronic device in a predetermined notification panel area of the electronic device. The first setting area 75 may include at least one control item used for configuring a UI to be generated in the notification panel area. In this instance, the at least one control item included in the first setting area 75 may be generated using received data information. The at least one control item included in the first setting area 75 may be generated in a manner that prompts a user to select whether to display (add) the same in the notification panel area. For example, the at least one control item included in the first area 75 may basically include a control item that supports simple power control of an external electronic device.

Referring to FIG. 7D, descriptions will be provided using the case in which the external electronic device is an air conditioner. Also, received data information may include data information corresponding to a power-setting function for setting turning-on or turning-off of the air conditioner, data information corresponding to a temperature-setting function of the air conditioner, and data information corresponding to a wind-strength setting function of the air conditioner.

The electronic device may display at least one control item corresponding to each described function in the first setting area 75 in the form shown in FIG. 7D. The control item may include a button for selecting whether to display the same in a notification panel area. For example, a power-setting control item may be displayed using the data information corresponding to the power-setting function. A temperature control item may be displayed using the data information corresponding to the temperature-setting function. A wind-strength control item may be displayed using the data information corresponding to the wind-strength setting function. For example, when the label of the data information corresponding to the power-setting function is "power setting", character information of the control item may be generated to be "power setting". When a data type is the bool type, a component type may be generated to be a button for selecting whether to perform setting, and may be displayed. For example, when the label of the data information corresponding to the wind-strength setting function is "wind strength", character information of the control item may be generated as "wind strength". When a data type is the int type, a component type may be generated to be a progress bar. Also, the range of progress of the progress bar may be generated to correspond to the range of the data information.

The second setting area 76 may be an area for generating a UI for controlling the external electronic device in a predetermined indicator area of the electronic device. The second setting area 76 may include at least one control item used for configuring a UI to be generated in the indicator area. In this instance, the at least one control item included in the second setting area 76 may be generated using received data information. The at least one control item included in the second setting area 76 may include a button for selecting whether to display the same in the indicator area.

For example, the at least one control item included in the second setting area 76 may include at least one control item of which a data type is the bool type from the received data information. Also, for example, a control item for selecting whether to display an icon of the external electronic device in the indicator area may be further included in the second area 76. For example, when a user selects not to display the icon of the external electronic device in the indicator area, at least one control item of which a data type is the bool type may automatically become non-selectable. Data information for generating a control item for selecting whether to display the icon of the external electronic device in the indicator area may be received from the external electronic device, or may be stored in the electronic device.

When the external electronic device is an air conditioner, the electronic device may display at least one control item corresponding to each function in the form of FIG. 7D, in the second setting area 76. For example, using the data information corresponding to the power-setting function, a power-setting control item may be displayed. Also, a display control item for selecting whether to display the icon of the external electronic device in the notification area may be displayed.

The third setting area 77 may be an area for setting an icon indicating the external device. The third setting area 77 may display the forms of icons previously stored in the electronic device, or the forms of icons received from an external electronic device. The forms of icons may include buttons that enable a user to make selection. Also, the third setting area 77 may further include a button that imports the form of an icon from the memory of the electronic device and/or from the outside.

In operation 650, the electronic device may determine whether user input for selecting a control item included in the setting window is received. The control item may correspond to at least one function of the external electronic device. In operation 650, when it is determined that user input is received, the electronic device may proceed with operation 660. Otherwise, the electronic device proceeds with operation 650 again.

In operation 660, the electronic device may generate and display a UI including the selected control item.

Referring to FIG. 7D, selection is made in the first setting area 75 in response to reception of a user input (touch input) so as to display the power-setting control item and the wind-strength control item in the notification panel area. Controlling turning-on or turning-off of an air conditioner via the power-setting control item may be performed by selecting turning-on or turning-off according to reception of user input (touch input) on a power button of the power-setting control item. Also, controlling the wind strength of the air conditioner via the wind-strength control item may be performed by setting a wind strength according to reception of a user input (a drag gesture) on a progress bar of the wind-strength control item.

Also, selection is made in the second setting area 76 according to reception of a user input (a touch input) so as to display a display-control item and a power-setting control item in the indicator area.

Also, according to reception of a user input (touch input), a first icon form may be selected in the third setting area 77.

Referring to FIG. 7E, a first icon 78 generated in the first icon form that is selected in the third setting area 77 may be displayed in a quick-setting area 763 of a notification panel area 761. In response to user input(a touch) on the first icon 78, turning-on or turning-off of the power of a corresponding external electronic device may be controlled. Also, a progress bar 79 of the wind-strength control item selected in the first setting area 75 may be displayed in the quick-setting area 763. For example, the progress bar 79 of the wind-strength control item selected in the first setting area 75 may be displayed by extending the size of the quick-setting area 763. In response to user input (a drag gesture) on the progress bar 79, the wind strength of a corresponding external electronic device may be set. When the external electronic device is turned off, the progress bar 79 may be set so as not to be displayed.

Referring to FIG. 7F, the first icon 78 generated in the first icon form that is selected in the third setting area 77 may be displayed in an indicator area 765. In response to user input (a touch) on the first icon 78, turning-on or turning-off of the power of a corresponding external electronic device may be controlled. According to the current state of an external electronic device, the first icon 78 displayed in the indicator area 765 may be set to be displayed differently. For example, when the external electronic device is turned on, the first icon 78 may be shaded. When the external electronic device is turned off, the first icon 78 may not be shaded.

The electronic device may variously generate a UI, which is displayed in the quick-setting area 763 of FIG. 7E, so as to control an external electronic device. For example, according to received data information, the type of control item displayed in each setting area in a setting window of FIG. 7D may be changed, and the configuration of a UI displayed in the quick-setting area 763 of FIG. 7E may be also changed.

According to various embodiments, when the electronic device (e.g., the electronic device 101) does not receive data information from an external electronic device (e.g., the electronic device 104), the electronic device may generate a UI which enables only a signal associated with a simple operation of turning on or off the external electronic device to be processed. For example, the electronic device may store, in a memory (e.g., the memory 130), a UI basic configuration which enables only a signal associated with the operation of turning on or off the external electronic device to be processed when data information registered in an external electronic device does not exist. For example, when data information registered in the external electronic device does not exist, the electronic device may receive a signal indicating that registered data information does not exist from the external electronic device. Also, when the signal indicating that the registered data information does not exist is received, the electronic device may display, on a display (e.g., the display 160), a UI which enables only a signal associated with an operation of turning on or off the external electronic device to be processed.

Figure 8A:
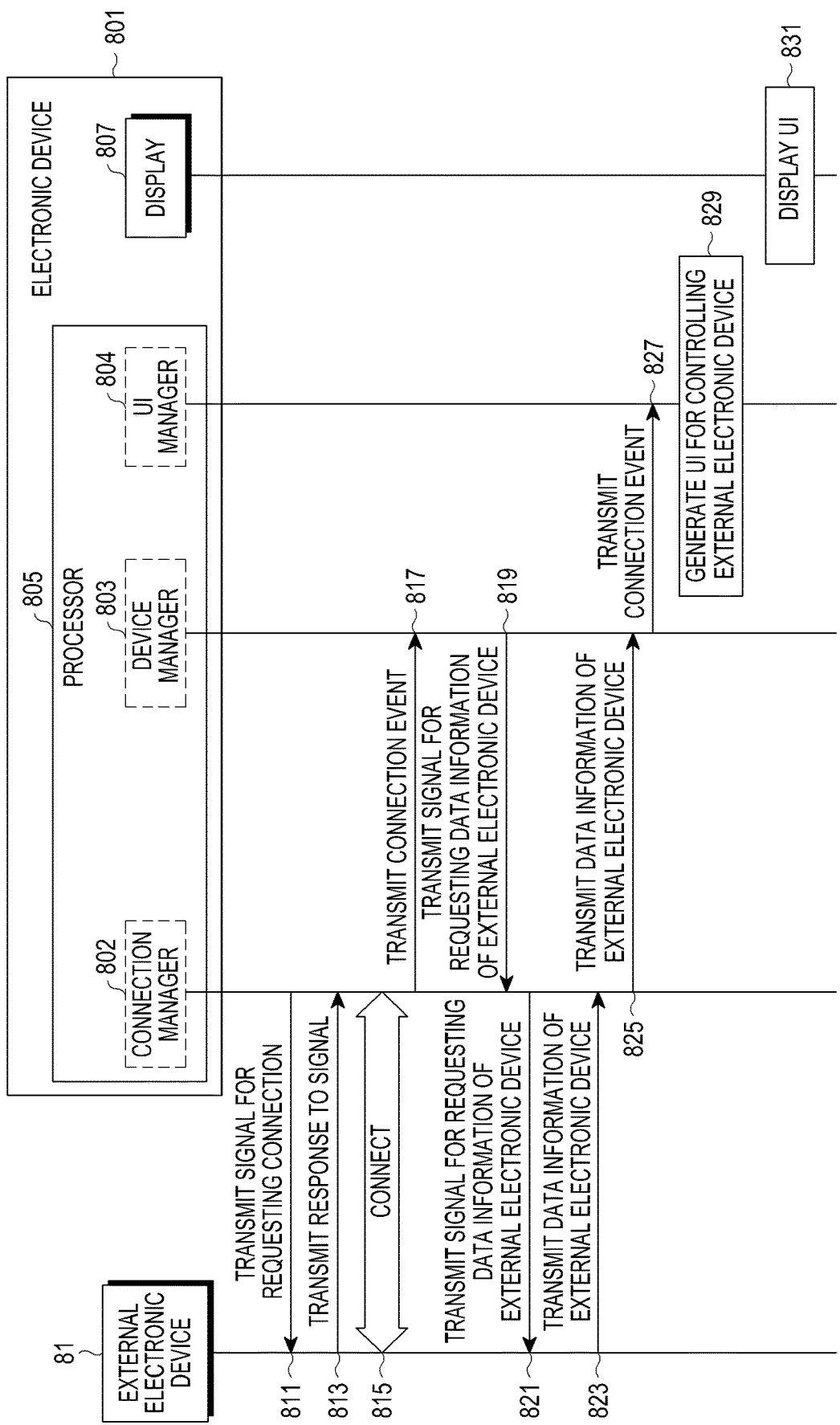
FIG. 8A is a flowchart illustrating operations of generating and displaying a user interface for controlling an external electronic device by an electronic device according to various embodiments.

FIG. 8A is a flowchart illustrating operations of generating and displaying a user interface for controlling an external electronic device by an electronic device (e.g., the electronic device 101) according to various embodiments.

Referring to FIG. 8A, an electronic device 801 (e.g., the electronic device 101) may include a processor 805 (e.g., the processor 120), a display 807 (e.g., the display 160), and an input unit 809 (e.g., the input/output interface 150). The processor 805 may include a connection manager 802 (e.g., the connection manager 221), a device manager 803 (e.g., the device manager 223), and a UI manager 804 (e.g., the UI manager 225).

In operation 811, the connection manager 802 may transmit a signal for requesting a connection to an external electronic device 81 (e.g., the external electronic device 104).

In operation 813, the external electronic device 81 may transmit a response to the signal.

In operation 815, the connection manager 802 and the external electronic device 81 may be connected.

In operation 817, the connection manager 802 may transmit a connection event to the device manager 803.

In operation 819, the device manager 803 may transmit a signal for requesting data information of the external electronic device 81 to the connection manager 802. In operation 821, the connection manager 802 may transmit a signal for requesting data information of the external electronic device 81 to the external electronic device 81. The data information has already been described, and thus a detailed description thereof will be omitted.

In operation 823, the external electronic device 81 may transmit the data information of the external electronic device 81 to the connection manager 802. In operation 825, the connection manager 802 may transmit the data information of the external electronic device 81 received from the external electronic device 81 to the device manager 803.

In operation 827, the device manager 803 may transmit a connection event corresponding to the received data information of the external electronic device 81 to the UI manager 804.

In operation 829, the UI manager 804 may generate a UI for controlling the external electronic device 81. In operation 831, the display 807 may display the UI generated by the UI manager 804. The UI for controlling the external electronic device 81 has already been described, and thus, a detailed description thereof will be omitted.

Figure 8B:
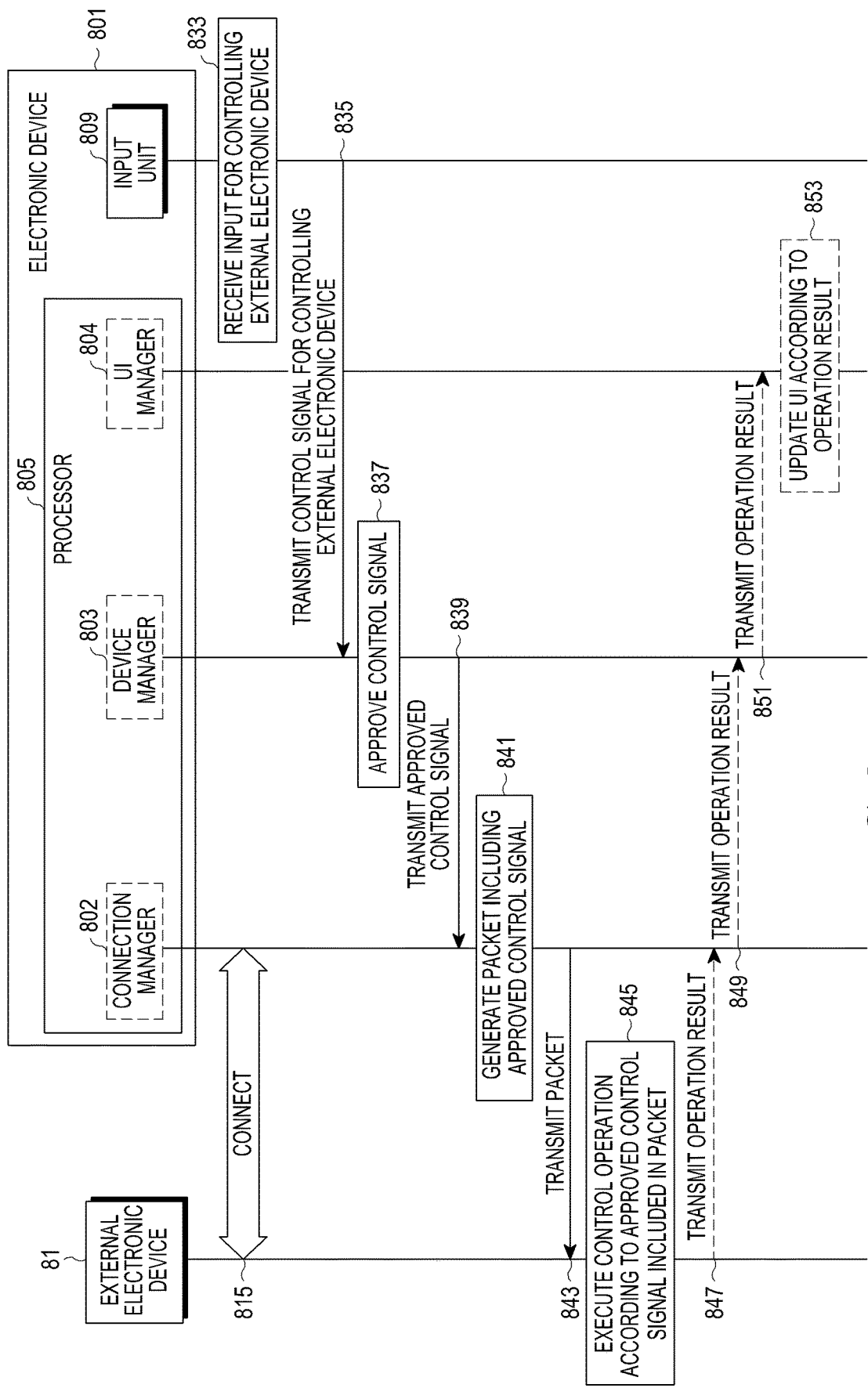
FIG. 8B is a flowchart illustrating operations of controlling an external electronic device in response to user input for controlling the external electronic device by an electronic device according to various embodiments.

FIG. 8B is a flowchart illustrating an operation of controlling an external electronic device in response to user input for controlling the external electronic device by an electronic device (e.g., the electronic device 101) according to various embodiments. After executing operation 831 of FIG. 8A, which has already been described, the electronic device may execute operation 835, which will be described below, in response to user input. Alternatively, when a UI for controlling the external electronic device 81 is displayed in the electronic device, the electronic device may connect the connection manager 802 and the external electronic device 81 in operation 815 according to operations 811 and 813 of FIG. 8A, and then may execute operation 833, which will be described below.

In operation 833, the input unit 809 may receive input for controlling the external electronic device 81. For example, user input (e.g., a touch, a drag, or the like) on the UI displayed in the display 807 may be received.

In operation 835, the input unit 809 may transmit, to the device manager 803, a control signal for controlling the external electronic device 81 according to the received input.

In operation 837, the device manager 803 may approve the received control signal. In operation 839, the device manager 803 may transmit the approved control signal to the connection manager 802.

In operation 841, the connection manager 802 may generate a packet including the approved control signal. In operation 843, the connection manager 802 may transmit the generated packet to the external electronic device 81.

In operation 845, the external electronic device 81 may execute a control operation according to the approved control signal included in the packet.

For example, the external electronic device 81 may or may not execute operation 847 according to the type of the approved control signal. For example, when the approved control signal includes a state information request signal that requests the state information of the external electronic device 81, the external electronic device 81 may execute operation 847.

In operation 847, the external electronic device 81 may transmit the result of the executed control operation to the connection manager 802. In operation 849, the connection manager 802 may transmit the operation result to the device manager 803. In operation 851, the device manager 803 may transmit the operation result to the UI manager 804.

In operation 853, the UI manager 804 may update a UI according to the operation result.

According to the above-described operation of FIG. 8, by a request from the device manager 803, the external electronic device 81 may receive a request pertaining to data information collection. In this instance, when data information registered in the external electronic device 81 does not exist, the UI manager 804 may support a basic configuration such that only a signal associated with a simple power-on/off operation is processed.

Figure 9:
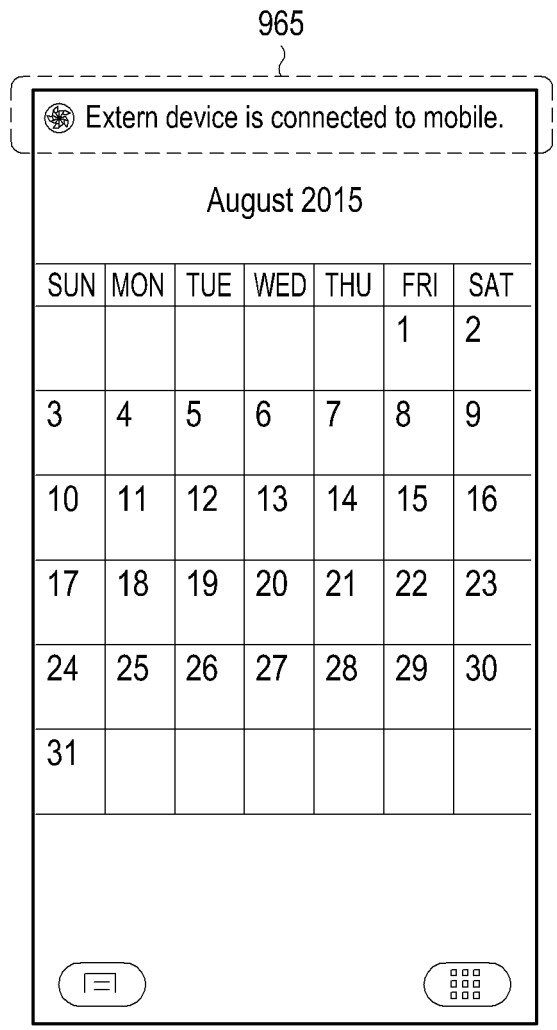
FIG. 9 is a diagram illustrating a change in the state of an electronic device, based on an operation of controlling an external electronic device by the electronic device according to various embodiments.
Figure 9:
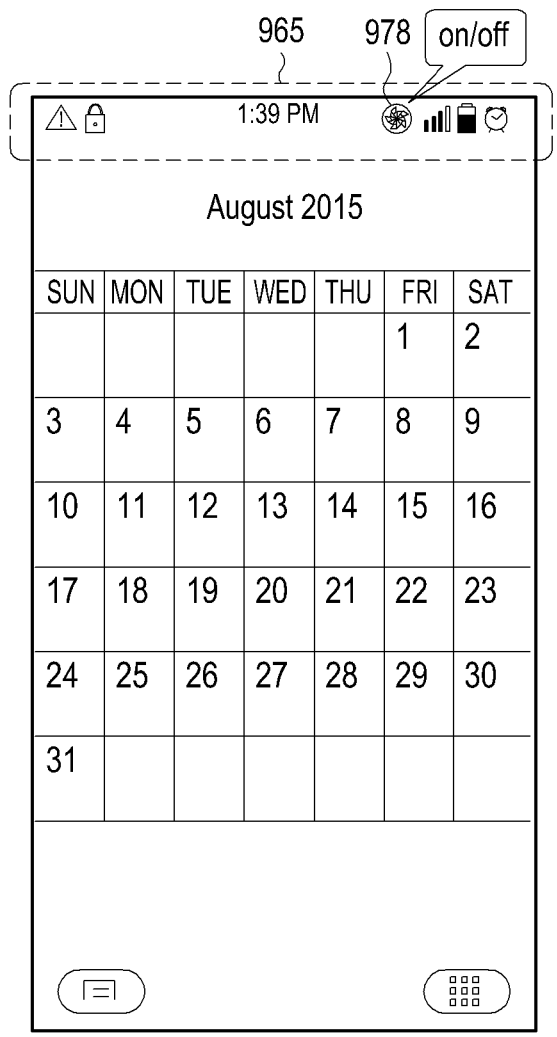

FIG. 9 is a diagram illustrating a change in the state of an electronic device according to an operation of controlling an external electronic device (e.g., the electronic device 104) by an electronic device (e.g., the electronic device 101) according to various embodiments.

When the electronic device and the external electronic device are connected, the electronic device may display information indicating that the external electronic device is connected to the electronic device in an indicator area 965, as illustrated in FIG. 9A. For example, when the external electronic device and a connection manager (e.g., the connection manager 221) of the electronic device are connected, and a device manager (e.g., the device manager 223) of the electronic device successfully obtains data information for controlling the external electronic device via the connection manager, the electronic device may display information, indicating that the external electronic device is connected, in the indicator area for a predetermined period of time.

According to the above-described embodiments, when a UI for controlling an external electronic device is generated, the electronic device may display a UI 978 for controlling an external electronic device in the indicator area 965, as illustrated in FIG. 9B. For example, by allowing a user to perform a touch on the UI 978 for controlling the external electronic device displayed in the indicator area 965 and to directly control bool-type control information of the external electronic device, the external electronic device may be controlled without accessing a notification panel (e.g., the notification panel 761).

For example, a user may perform a touch on the UI 978, which is for controlling the external electronic device and is displayed in the indicator area 965, so as to control the external electronic device to be turned on or off. In the state in which the external electronic device is turned off, when a user provides a touch on the UI 978 for controlling the external electronic device, a control signal for turning on the external electronic device may be transmitted to the external electronic device. For example, in the state in which the external electronic device is turned on, when a user provides a touch on the UI 978 for controlling the external electronic device, a control signal for turning off the external electronic device may be transmitted to the external electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A method of controlling an external electronic device by an electronic device, the method comprising:
receiving, from the external electronic device connected to the electronic device, information corresponding to at least one function of the external electronic device;

identifying a data type of a control item to be displayed on a setting window based on the received information, wherein the control item corresponds to the at least one function;
generating the control item in a form corresponding to the identified data type;
displaying the setting window including the generated control item;
receiving a user input for the control item included in the displayed setting window;
based on the user input, setting a region for displaying the control item or a user interface corresponding to the control item among at least one of an indicator region or a notification panel region of a display, the indicator region being placed at an uppermost position of the display and being a region for displaying a current status of the electronic device, and the notification panel region being a region which appears by a user input associated with the indicator region, wherein the user interface is used for controlling the at least one function of the external electronic device, and
displaying the control item or the user interface in the set region through the display.

2. The method of claim 1, wherein the receiving, from the external electronic device connected to the electronic device, the information corresponding to the at least one function of the external electronic device comprises:
displaying a list of external electronic devices connectable to the electronic device;
when a user input of selecting the external electronic device from the displayed external electronic device list is received, displaying a screen for selecting whether to establish a connection to the external electronic device;
when a user input of selecting the connection to the external electronic device is received, establishing the connection to the external electronic device; and
receiving the information from the external electronic device via the connection to the external electronic device.

3. The method of claim 1, wherein the displaying the setting window including the generated control item comprises:
displaying the generated control item in at least one of a first area or a second area of a display of the electronic device,
wherein the setting window further comprises a first setting area corresponding to the first area, a second setting area corresponding to the second area, and a third setting area for setting an icon indicating the external electronic device.

4. The method of claim 1, further comprising:
receiving state information corresponding to the function of the external electronic device from the external electronic device,
wherein displaying the control item or the user interface comprises:
displaying the control item in which the state information is reflected.

5. The method of claim 1, further comprising:
transmitting a signal for controlling the at least one function corresponding to the control item to the external electronic device when a user input for the displayed user interface is received.

6. An electronic device, comprising:
an input device;
a communication circuit;
a display; and
a processor configured to:
receive, from an external electronic device connected via the communication circuit, information corresponding to at least one function of the external electronic device,
identify a data type of a control item to be displayed on a setting window based on the received information, wherein the control item corresponds to the at least one function,
generate the control item in a form corresponding to the identified data type,
control the display to display, the setting window including the generated control item,
receive a user input via the input device for the control item included in the displayed setting window,
based on the user input, setting a region for displaying the control item or a user interface corresponding to the control item among at least one of an indicator region or a notification panel region of the display, the indicator region being placed at an uppermost position of the display and being a region for displaying a current status of the electronic device, and the notification panel region being a region which appears by a user input associated with the indicator region, wherein the user interface is used for controlling the at least one function of the external electronic device; and
control the display to display the control item or the user interface in the set region through the display.

7. The electronic device of claim 6, wherein the processor is configured to: control the display to display, an external electronic device list of external electronic devices connectable to the electronic device, and when a user input of selecting the external electronic device from the displayed external electronic device list is received via the input device, perform control so as to establish a connection to the external electronic device via the communication circuit.

8. The electronic device of claim 7, wherein the processor is configured to:
control the display to display a screen for selecting whether to establish the connection to the external electronic device when a user input of selecting the external electronic device from the displayed external electronic device list is received via the input device; and establish the connection to the external electronic device via the communication circuit when a user input of selecting the connection to the external electronic device is received via the input device.

9. The electronic device of claim 6, wherein the information includes at least one from among an ID of the control item corresponding to the function, a label of the control item corresponding to the function, the data type of the control item corresponding to the function, or a range of a setting value of a component required according to the data type.

10. The electronic device of claim 6, wherein the control item is to be displayed in at least one of a first area or a second area of the display, using the data information.

11. The electronic device of claim 10, wherein the setting window comprises a first setting area corresponding to the first area, and a second setting area corresponding to the second area.

12. The electronic device of claim 11, wherein the setting window further comprises a third setting area for setting an icon indicating the external electronic device.

13. The electronic device of claim 6, wherein the processor is configured to perform control so as to receive state information corresponding to the function of the external electronic device from the external electronic device via the communication circuit.

14. The electronic device of claim 13, wherein the processor is configured to control the display to display the selected control item in which the state information is reflected.

15. The electronic device of claim 6, wherein the processor is configured to transmit a signal for controlling the function corresponding to the control item to the external electronic device via the communication circuit when a user input for the user interface is received via the input device.

* * * * *